(12) United States Patent
Yahalom

(10) Patent No.: US 6,516,292 B2
(45) Date of Patent: *Feb. 4, 2003

(54) METHOD AND SYSTEM FOR NUMERICAL SIMULATION OF FLUID FLOW

(76) Inventor: Asher Yahalom, Hanassi 45, 54021 Givat Shmuel (IL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/247,588

(22) Filed: Feb. 10, 1999

(65) Prior Publication Data

US 2002/0022946 A1 Feb. 21, 2002

(51) Int. Cl.$^7$ .............. G06G 7/48; G06G 7/50; G06T 15/00; B01D 21/26
(52) U.S. Cl. ............... 703/9; 703/5; 210/512; 345/419
(58) Field of Search .............. 703/9, 5; 345/419; 210/512

(56) References Cited

U.S. PATENT DOCUMENTS

| 4,267,488 A | * | 5/1981 | Wells ............. 376/107 |
| 6,062,819 A | * | 5/2000 | Zangeneh et al. ..... 416/186 R |

OTHER PUBLICATIONS

Brown: "On variational principles for gravitating perfect fluids"; Annals of Physics; vol. 248; pp. 1–33, May 1996.*
Elassser et al.: "Lyapunov stability of a perfect fluid and multifluid plasma equilibria"; Physics Lett., vol. 230; pp. 67–72, Jun. 1997.*
Lifschitz et al.; "The onset of instability in exact vortex rings with swirl"; J. Comp. Physics; pp. 8–29, Nov. 1996.*
Kotiuga; "Clebsch potentials and the visualization of three–dimensional solenoidal vector fields"; IEEE Trans. Magnetics; pp. 3986–3989; Sep. 1991.*

Merches; "A variational approach to ideal magnetofluid systems"; Physics Lett. A; vol. 235, issue 6; pp. 617–629; Nov. 1997.*

Printout from website of inventor; "http//www.incubators.org.il/17032.htm", two pages from the site and two pages showing the internet search results; search conducted Jul. 4, 2001; date of website not provided.*

* cited by examiner

*Primary Examiner*—Hugh M. Jones
(74) *Attorney, Agent, or Firm*—Mark M. Friedman

(57) ABSTRACT

A method of numerical simulation of fluid flow past a body. The physics of stationary flow is formulated in terms of a potential functional of at most four scalar fields: three Clebsch scalar fields and a density field. The physics of non-stationary flow is formulated in terms of an action that includes an action integral of a Lagrangian functional of the same four scalar fields and an initial and a final integral of a function of the same four scalar fields. The values of the fields are varied to extremize the potential functional or the action, under the constraint of appropriate boundary conditions. Potential functionals and Lagrangian functionals for compressible and incompressible flows with zero velocity normal to the surface of the body, and for potential flows, are described.

25 Claims, 13 Drawing Sheets

METHOD AND SYSTEM FOR NUMERICAL SIMULATION OF FLUID FLOW

FIELD AND BACKGROUND OF THE INVENTION

The present invention relates to the numerical simulation of fluid flow and, more particularly, to a numerical method of simulating barotropic fluid flow past a body by minimizing a potential functional.

Barotropic fluid flow is described by the Euler equations:

$$\frac{\partial \vec{v}}{\partial t} + \vec{v} \cdot \vec{\nabla} \vec{v} + \vec{\nabla}(h + \Phi) = 0 \quad (1)$$

and of the continuity equation $$\frac{\partial \rho}{\partial t} + \vec{\nabla} \cdot (\rho \vec{v}) = 0 \quad (2)$$

where $\vec{v}(x^k, t)$ is the velocity vector field, $\Phi(x^k, t)$ is a potential relating to an external force, $\rho(x^k, t)$ is the scalar density field, and h, the specific enthalpy, is a function of $\rho$ through the equation of state of the fluid. $\vec{v}$, $\Phi$ and $\rho$ are functions of position $x^k = (x,y,z)$ in space and of time t. In the special case of a stationary flow with small viscosity, the time derivatives vanish:

$$\vec{v} \cdot \vec{\nabla} \vec{v} + \vec{\nabla}(h + \Phi) = 0; \quad \vec{\nabla} \cdot (\rho \vec{v}) = 0 \quad (3)$$

Only in trivial cases can these equations be solved analytically. In cases of practical interest, for example, in aerodynamics and hydrodynamics, these equations must be solved numerically. The most common way to solve these equations is by integrating them. The possible numerical instabilities associated with numerical integration are well known and need not be detailed here. A numerical solution based on a variational principle would be inherently numerically stable. Ideally, such a numerical solution would involve finding the minima of a potential functional with respect to the associated variables. In the case of fluid flow, the variables are four scalar fields: $\rho$ and the three Cartesian components of $\vec{v}$. Heretofore, no variational formulation of barotropic fluid flow has represented the solutions of equations (1) and (2) or of equations (3) as the values of $\vec{v}$ and $\rho$, or of any other set of only four scalar fields, that minimize a potential functional. The smallest number of scalar fields obtained heretofore was seven, by R. L. Seliger and G. B. Witham (*Proc. Roy. Soc. London*, Vol. A305, p. 1, 1968). Because equations (1)–(3) depend on only four scalar fields, it should be possible to obtain a variational formulation of barotropic fluid flow in terms of only four scalar fields.

There is thus a widely recognized need for, and it would be highly advantageous to have, a method of finding numerical solutions of the equations of fluid flow by minimizing a potential functional of four scalar fields.

SUMMARY OF THE INVENTION

According to the present invention there is provided a numerical method of simulating fluid flow past a body having a boundary, including the steps of: (a) formulating the fluid flow in terms of a potential functional of at most four fundamental scalar fields and at most two scalar variables; and (b) extremizing the potential functional with respect to the at most four fundamental scalar fields and with respect to the at most two scalar variables.

According to the present invention there is provided a system for numerical simulation of fluid flow, including: (a) a software module including a plurality of instructions for computing, from discrete representations of at most four fundamental scalar fields, a potential functional representative of the fluid flow, and for varying the discrete representations to extremize the potential functional; (b) a processor for executing the instructions; and (c) a memory for storing the discrete representations.

According to the present invention there is provided a numerical method of simulating fluid flow, including the steps of: (a) formulating the fluid flow in terms of a potential functional of at most four fundamental scalar fields and at most two scalar variables; and (b) extremizing the potential functional with respect to the at most four fundamental scalar fields and with respect to the at most two scalar variables.

According to the present invention there is provided a numerical method of simulating fluid flow past a body having a boundary, including the steps of: (a) formulating the fluid flow in terms of an action which is the sum of: (i) an action integral, from an initial time $t_0$ to a final time $t_1$, of a Lagrangian functional L of at most four fundamental scalar fields, (ii) a spatial integral of a function of the at most four fundamental scalar fields at the final time $t_1$, and (iii) a negative of a spatial integral of the function of the at most four fundamental scalar fields at the initial time $t_0$; and (b) extremizing the action with respect to the at most four fundamental scalar fields.

According to the present invention there is provided a numerical method of simulating fluid flow including the steps of: (a) formulating the fluid flow in terms of an action which is the sum of: (i) an action integral, from an initial time $t_0$ to a final time $t_1$, of a Lagrangian functional L of at most four fundamental scalar fields, (ii) a spatial integral of a function of the at most four fundamental scalar fields at the final time $t_1$, and (iii) a negative of a spatial integral of the function of the at most four fundamental scalar fields at the initial time $t_0$; and (b) extremizing the action with respect to the at most four fundamental scalar fields.

According to the present invention there is provided a system for numerical simulation of fluid flow, including: (a) a software module including a plurality of instructions for computing, from discrete representations of at most four fundamental scalar fields, an action representative of the fluid flow, and for varying the discrete representations to extremize the action; (b) a processor for executing the instructions; and (c) a memory for storing the discrete representations.

It is shown in the Theory section below that stationary barotropic fluid flow can be formulated as the extremization of a potential functional of at most four scalar fields: the Clebsch scalar fields $\alpha$, $\beta$ and $\nu$ and the density field $\rho$; and also of at most two scalar variables $\beta_1$ and $\nu_1$. Specifically, the functional is minimized with respect to $\alpha$, $\beta$ and $\nu$ and maximized with respect to $\beta_1$ and $\nu_1$. The scalar fields are functions of the position vector $x^k$. The velocity vector field $\vec{v}$ is related to the Clebsch scalar fields through $\vec{v} = \alpha \vec{\nabla} \beta + \vec{\nabla} \nu$.

The potential functionals are as follows:

If the component of $\vec{v}$ normal to the boundary of the region of fluid flow is zero, or if the density $\rho$ on the boundary is zero, the potential functional is $$\int_V \left[\frac{1}{2}(\alpha\vec{\nabla}\beta + \vec{\nabla}v)^2 + \varepsilon(\rho) + \Phi\right]\rho\, d^3x - \beta_1\left(\int_V \alpha\rho_0\, d^3x - \overline{\alpha}M_0\right) - v_1\left(\int_V \rho\, d^3x - M_0\right) \quad (4)$$

(equations 56 and 62 of the Theory section below) for compressible flows and $$\int_V \left[\frac{1}{2}(\alpha\vec{\nabla}\beta + \vec{\nabla}v)^2 + \Phi\right]\rho_0\, d^3x - \beta_1\left(\int_V \alpha\rho_0\, d^3x - \overline{\alpha}M_0\right) \quad (5)$$

(equations 65 and 66 of the Theory section below) for incompressible flows. $\varepsilon(\rho)$ is the specific internal energy of the fluid, in the case of a compressible flow, and is related to the specific enthalpy by.

$$h = \frac{\partial(\rho\varepsilon)}{\partial\rho} \quad (6)$$

$\overline{\alpha}$ and $M_0$ are constants. The integrals are over the volume V occupied by the fluid. $\rho_0$ is the constant density, in the case of an incompressible flow. The functional is minimized with respect to $\alpha$, $\beta$ and $v$, and maximized with respect to $\beta_1$. In the case of a compressible flow, the functional also is minimized with respect to $\rho$ and maximized with respect to $v_1$.

In the case of potential flows, for which $\vec{\nabla}\times\vec{v}=0$, the potential functional is $$\int_V \left[\frac{1}{2}(\vec{\nabla}v)^2 + \varepsilon(\rho) + \Phi\right]\rho\, d^3x - v_1\left(\int_V \rho\, d^3x - M_0\right) \quad (7)$$

(equations 102 and 103 of the Theory section below) for compressible flows and $$\int_V \left[\frac{1}{2}(\vec{\nabla}v)^2 + \Phi\right]\rho_0\, d^3x \quad (8)$$

(equation 106 of the Theory section below) for incompressible flows. $\varepsilon(\rho)$ is the specific internal energy of the fluid, in the case of a compressible flow. The integrals are over the volume occupied by the fluid. $M_0$ is a constant. $\rho_0$ is the constant density, in the case of an incompressible flow. The functional is minimized with respect to $v$. In the case of a compressible flow, the functional also is minimized with respect to $\rho$ and maximized with respect to $v_1$.

It also is shown in the Theory section below (see equation 113 therein) that non-stationary barotropic fluid flow can be formulated as the maximization of an action which is the sum of three integrals: an action integral of a Lagrangian functional L of three Clebsch scalar fields $\alpha$, $\beta$ and $v$ and the density field $\rho$ from an initial time $t_0$ to a final time $t_1$.

$$\int_{t_0}^{t_1} L\, dt \quad (9)$$

an initial integral over the four scalar fields at time $t_0$:

$$-\int_V (\alpha(x^k, t_0)\beta(x^k, t_0) + v(x^k, t_0))\rho(x^k, t_0)\, d^3x \quad (10)$$

and a similar final integral over the four scalar fields at time t1:

$$\int_V (\alpha(x^k, t_1)\beta(x^k, t_1) + v(x^k, t_1))\rho(x^k, t_1)\, d^3x \quad (11)$$

The spatial integrals are over the volume V occupied by the fluid. Note that the integrand of the initial integral is the negative of the integrand of the final integral.

If the component of $\vec{v}$ normal to the boundary of the region of fluid flow is zero, or if the density $\rho$ on the boundary is zero, the Lagrangian functional is:

$$\int_V \left[-\left(\alpha\frac{\partial\beta}{\partial t} + \frac{\partial v}{\partial t}\right) - \frac{1}{2}(\alpha\vec{\nabla}\beta + \vec{\nabla}v)^2 - \varepsilon(\rho) - \Phi\right]\rho\, d^3x \quad (12)$$

(equation 31 of the Theory section below) for compressible flows and $$\int_V \left[-\left(\alpha\frac{\partial\beta}{\partial t} + \frac{\partial v}{\partial t}\right) - \frac{1}{2}(\alpha\vec{\nabla}\beta + \vec{\nabla}v)^2 - \Phi\right]\rho_0\, d^3x \quad (12)$$

(equation 35 of the Theory section below) for incompressible flows. As in the case of stationary flows, $\varepsilon(\rho)$ is the specific internal energy of the fluid, in the case of a compressible flow; the integrals are over the volume V occupied by the fluid; and $\rho_0$ is the constant density, in the case of an incompressible flow. The maximization is with respect to $\alpha$, $\beta$ and $v$, and also with respect to $\rho$ in the case of a compressible flow.

The Clebsch scalar fields $\alpha$, $\beta$ and $v$ and the density $\rho$ are referred to herein as "fundamental" scalar fields because only these fields are varied explicitly to minimize the potential functionals. The other scalar fields that appear in the potential functionals are functions of these fundamental scalar fields. For example, $\epsilon$ is a function of $\rho$, via equation (6).

In addition to being inherently stable, the present invention, as applied to stationary flows, is faster than the prior art methods and is easier to use for complex geometries.

A Note on Notation

In the Theory section below, the symbols $\alpha$, $\beta$ and $v$ are used to represent Clebsch variables that are functions of both space $x^k$ and time t. In the case of stationary flows, the space and time dependences of the Clebsch variables can be separated as follows:

$$\alpha = \hat{\alpha}(x^k) \quad (14)$$

$$\beta = \hat{\beta}(x^k) - \beta_1 t \quad (15)$$

$$v = \hat{v}(x^k) - v_1 t \quad (16)$$

In potential functionals for stationary flows as derived in the Theory section below, the Clebsch scalar fields are these functions $\hat{\alpha}$, $\hat{\beta}$ and $\hat{v}$ of $x^k$ only; and in the course of the derivations, the dependence on time drops out, leaving $\beta_1$ and $v_1$, as scalar variables to be varied, along with the values of the scalar fields $\hat{\alpha}$, $\hat{\beta}$ and $\hat{v}$, to extremize the potential functionals. For simplicity elsewhere herein, when the potential functionals of stationary flows are discussed, the Clebsch scalar fields that enter into these potential functionals are denoted by $\alpha$, $\beta$ and $\nu$, without carets.

The symbol that is used herein for velocity, a lowercase italic "v" (v), and the symbol that is used herein for the third Clebsch scalar field, a lowercase Greek "nu" ($\nu$), are typographically similar. To avoid confusion, the reader should bear in mind that the symbol for velocity always appears with an arrow above it ($\vec{v}$) when referring to the vectorial velocity field, or with the subscripts x or y when referring to Cartesian components of the velocity field; and that the symbol for the third Clebsch scalar field appears either unadorned ($\nu$) when referring to the third Clebsch scalar field itself, or with the subscript 1 when referring to a constant that is related to the third Clebsch scalar field.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1A:
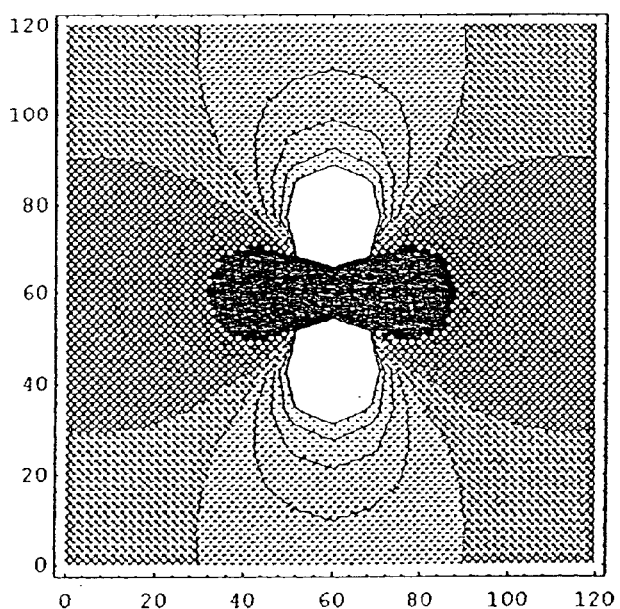
FIG. 1A is a contour plot of the x-component of the velocity of flow past a cylinder, computed analytically.

The present invention is of a method of computing the velocity and pressure of a barotropic fluid flowing past a body.

The principles and operation of computational fluid dynamics according to the present invention may be better understood with reference to the drawings and the accompanying description.

For numerical computation, the continuous scalar fields $\alpha$, $\beta$, $\nu$ and $\rho$, and functions thereof such as $\epsilon(\rho)$ are represented by their values at discrete points on regular grids. In the Theory section below, two interleaving rectangular grids are described for 2-dimensional computations, one grid for $\beta$ and $\nu$, and the other grid for $\alpha$, $\rho$, $\Phi$ and h. It will be clear to those skilled in the art how to extend these grids to three dimensions. The grids occupy the portion of space occupied by the fluid. In other words, values of the scalar fields are not specified inside the body.

Initial values of the Clebsch fields $\alpha$, $\beta$ and $\nu$ and, for compressible flow, of the density $\rho$, are specified at the grid points, and these values are varied to minimize the appropriate potential functional. The actual fields of interest are the velocity v and the density $\rho$. It is shown in the Theory section below how to obtain the initial values of the Clebsch fields from the initial values of the velocity. The final values of the velocity are obtained from the final values of the Clebsch fields from $\vec{v} = \alpha \vec{\nabla} \beta + \vec{\nabla} \nu (\vec{v} = \vec{\nabla} \nu$ in the case of potential flows).

The grids on which the scalar fields are represented are finite in size. For numerical simulation of flow past a finite body, the grids are made large enough so that the values of the velocity at the outer boundaries of the grids are the same as they would be in the absence of the body; and the velocity is fixed at those values.

In the case of the component of $\vec{v}$ normal to the boundary of the region of fluid flow being zero, it is not necessary to specify in advance the values of the tangential components of the velocity at the boundary of the body. Simply finding the values of $\alpha$, $\beta$, $\nu$ and $\beta_1$ (and also $\rho$ and $\nu_1$ for compressible flows), at grid points outside the body, that minimize the potential functional (4) or (5) automatically produces a velocity field $\vec{v} = \alpha \vec{\nabla} \beta + \vec{\nabla} \nu$ that has a vanishing component normal to the body.

Similarly, in the case of potential flows, merely varying the values of the scalar fields only on grid points outside the body, to minimize the appropriate potential functional, yields the desired solution.

In the case of the density $\rho$ on the boundary being zero, the boundary condition that is specified in advance at the grid points closest to the boundary of the body is precisely that: $\rho=0$.

If the component of $\vec{v}$ normal to the boundary of the region of fluid flow is zero, or if the density $\rho$ on the boundary is zero, the constants $\bar{\alpha}$ and $M_0$ also must be specified. $M_0$ is the volume integral of the initial estimate of $\rho$. $\bar{\alpha}$ is the volume integral of the initial estimate of $\alpha\rho$, divided by $M_0$.

Referring now to the drawings, FIGS. 1–4 compare the analytic solution and the numerical solution of the present invention for incompressible fluid flow past a circular cylinder. For an incompressible fluid flowing past a cylinder of radius a, if the flow is in the x-direction and the velocity of the fluid is asymptotically U at $x=\pm\infty$, the analytic solution is:

$$v = Ux\left(1 + \frac{a^2}{x^2+y^2}\right) \quad (17)$$

$$v_x = U\left(1 + a^2\left(\frac{x^2-y^2}{(x^2+y^2)^2}\right)\right) \quad (18)$$

$$v_y = -2U\frac{a^2}{(x^2+y^2)^2}xy \quad (19)$$

$$|\vec{v}| = \sqrt{v_x^2 + v_y^2} \quad (20)$$

The numerical solution was obtained by minimizing potential (8) with respect to the Clebsch scalar field $\nu$, represented by its values on a rectangular grid of 14641 points (121×121) with a spacing of 0.1 meters. The cylinder had a radius of 0.6 meters and the center of the cylinder was coincident with the center point of the grid. The asymptotic value U of the velocity was 1 m/sec. In accordance with equation (75) of the Theory section below, the initial value of v was a linear scalar field whose gradient was U in the x-direction and zero in the y-direction. Φ was taken to be zero. Note that the minimum of potential (8) is independent of $\rho_0$, so that the numerical problem was one of varying v to minimize the absolute value of its gradient, subject to the boundary conditions on the surface of the cylinder.

Figure 1B:
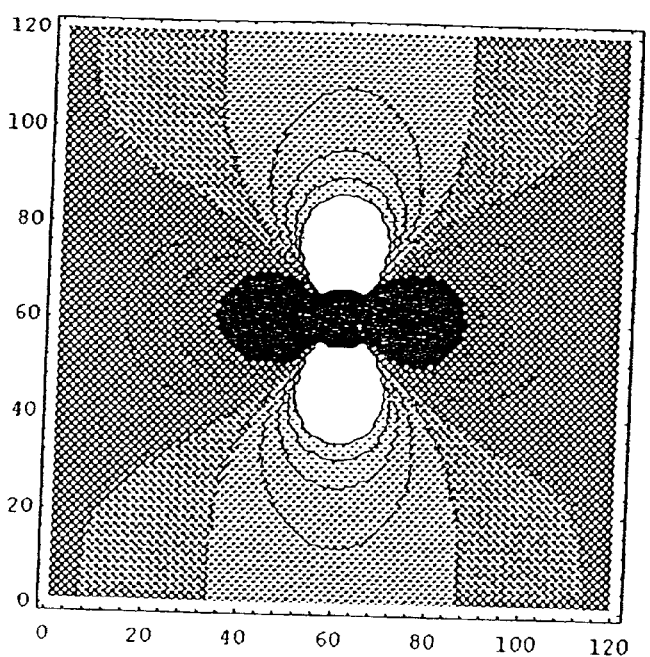
FIG. 1B is a contour plot of the x-component of the velocity of flow past a cylinder, computed numerically according to the present invention.
Figure 2A:
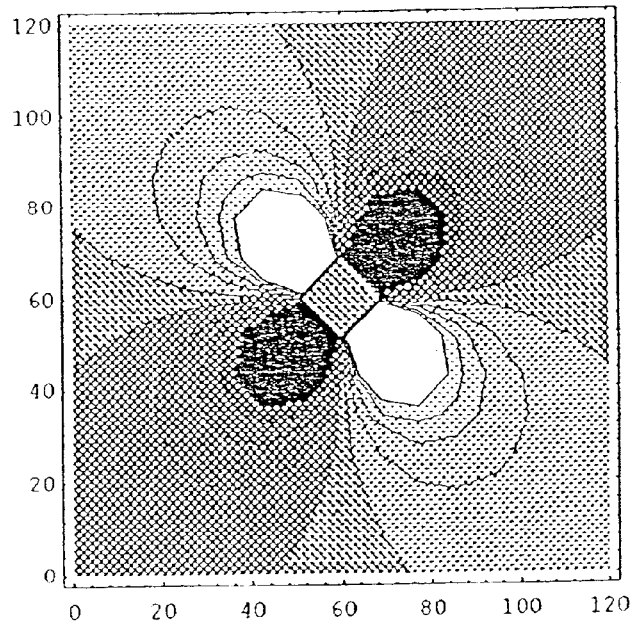
FIG. 2A is a contour plot of the y-component of the velocity of flow past a cylinder, computed analytically.
Figure 2B:
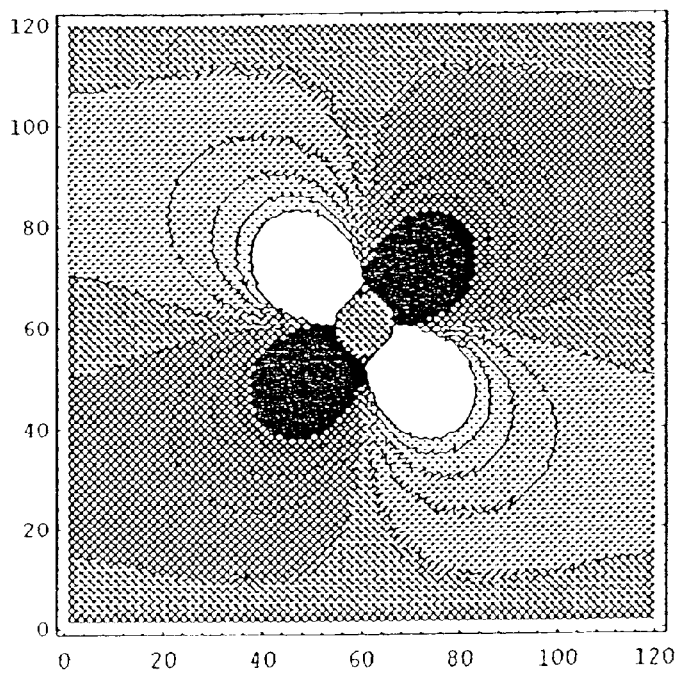
FIG. 2B is a contour plot of the y-component of the velocity of flow past a cylinder, computed numerically according to the present invention.
Figure 3A:
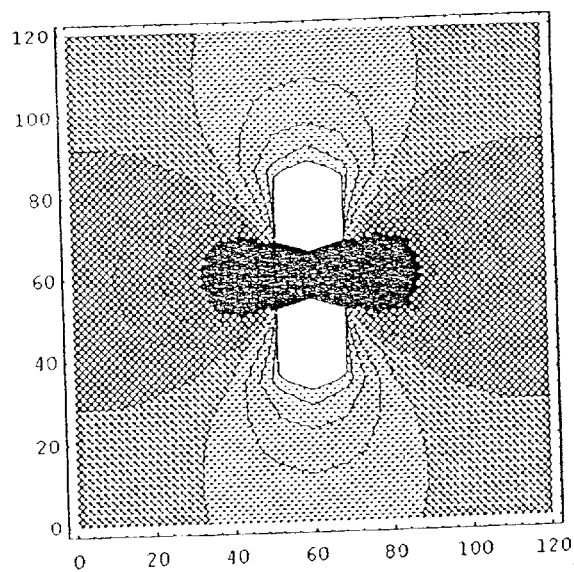
FIG. 3A is a contour plot of the magnitude of the velocity of flow past a cylinder, computed analytically.
Figure 3B:
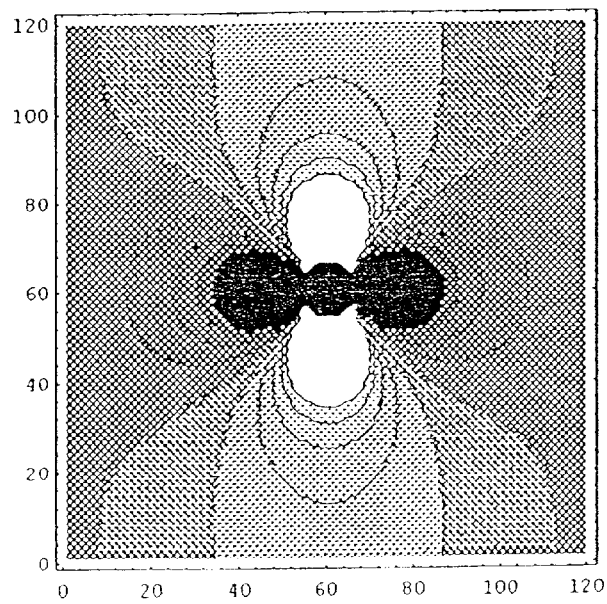
FIG. 3B is a contour plot of the magnitude of the velocity of flow past a cylinder, computed numerically according to the present invention.

FIG. 1A is a contour plot of the analytical values of $v_x$. FIG. 1B is a contour plot of the corresponding numerical values of $v_x$. FIG. 2A is a contour plot of the analytical values of $v_y$. FIG. 2B is a contour plot of the corresponding numerical values of $v_y$. FIG. 3A is a contour plot of the analytic values of velocity magnitude $|\vec{v}|$. FIG. 3B is a contour plot of the corresponding numerical values of $|\vec{v}|$. The axis labels are grid point indices.

Figure 4A:
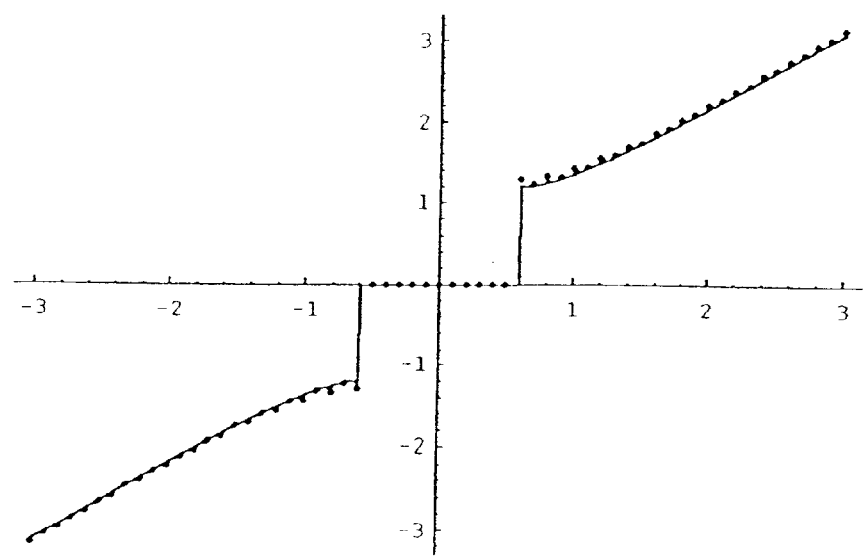
FIGS. 4A and 4B are plots of sections of the Clebsch scalar field $\nu$, computed both analytically and numerically according to the present invention.
Figure 4B:
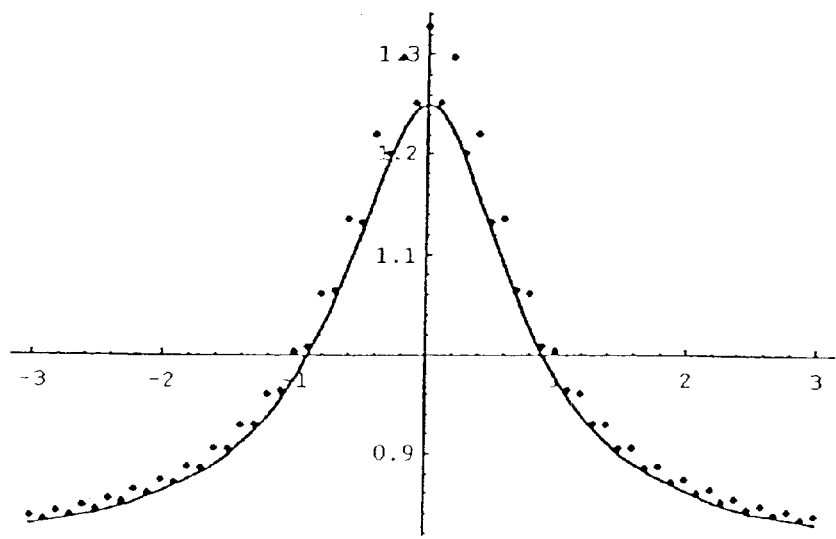

FIG. 4A is a plot of v along the line y=0 m from x=−3 m to x=3 m. FIG. 4B is a plot of v along the line x=0.8 m from y=−3 m to y=3 m. Note that the points −0.6 m≦x≦0.6 m in FIG. 4A are inside the cylinder. In both FIGS. 4A and 4B, the solid line represents analytic values of v and the discrete points represent numerical values of v.

The numerical computations for non-stationary flows are similar to the numerical computations for stationary flows, with the addition of one more dimension (time) to the grids. The time that a system requires to settle down from an initial non-stationary condition to a final stationary condition usually can be estimated, by dimensional analysis, as the ratio of a characteristic length to a characteristic velocity. This time is taken as $t_1-t_0$. The values of the Clebsch scalar fields and of the density field are specified at time $t_0$ to define the problem. The same values define the starting values of the scalar fields at all the other grid points, and those values are varied to minimize the action. Alternatively, the stationary flow technique is used to determine the final condition of the system, and the starting values of the scalar fields at intermediate times are determined by linear interpolation. Note that in general it is necessary to specify and fix the values of each of four scalar fields (three scalar fields for incompressible flows) at one particular time ($t_0$, $t_1$, or any time in between) to define the time-dependent problem. For example, the time-dependent problem can be defined by specifying initial and final values of β and v throughout space. The time-dependent problem defined in this way is solved by varying α and ρ at all times, and β and v at intermediate times, to minimize the action.

Figure 5:
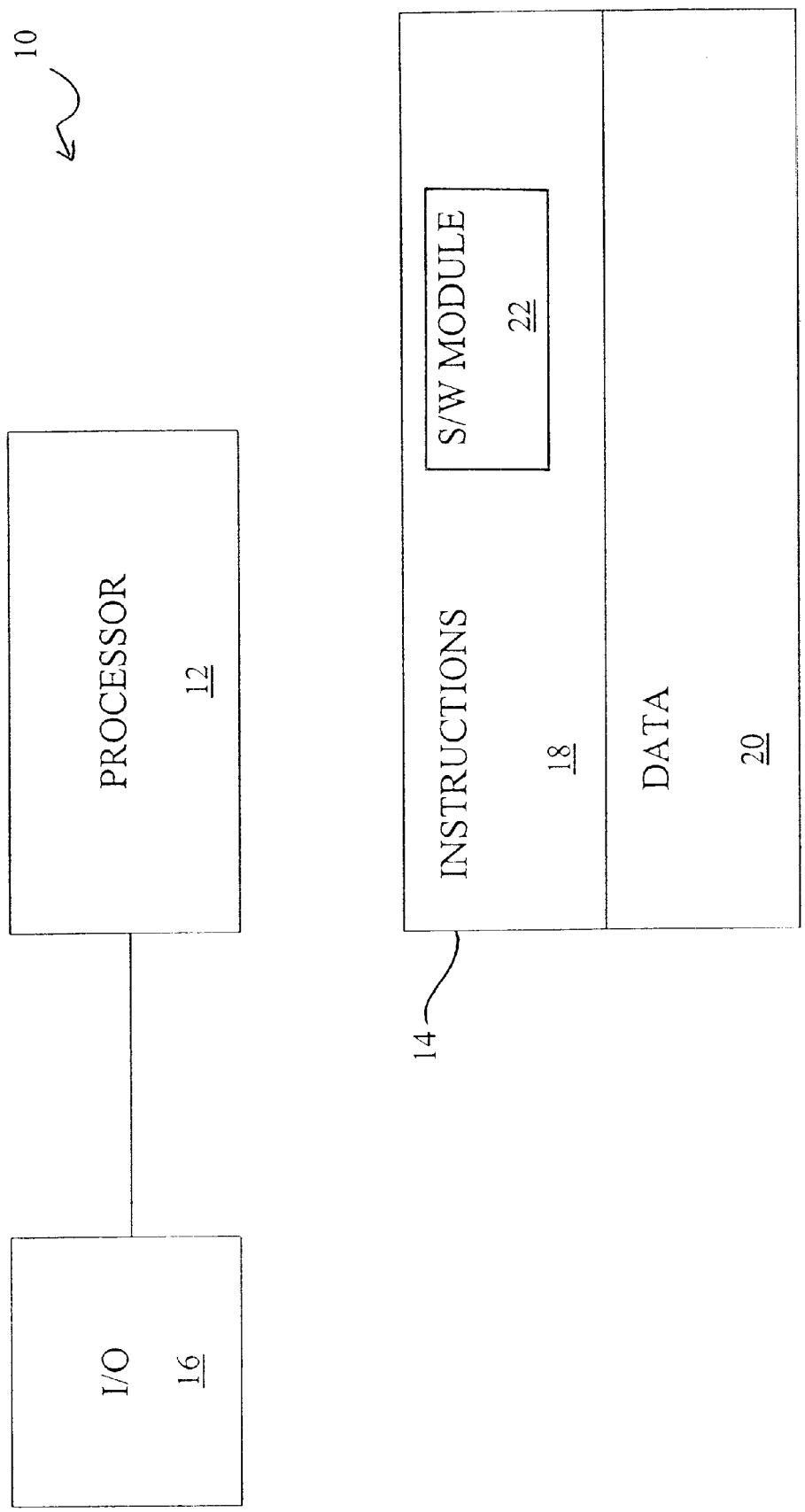
FIG. 5 is a high level block diagram of a system of the present invention.

FIG. 5 is a high level block diagram of a system 10 for numerical simulation of fluid flow according to the present invention. System 10 includes a processor 12, a random access memory 14 and a set of input/output devices, such as a keyboard, a floppy disk drive, a printer and a video monitor, represented by I/O block 16. Memory 14 includes an instruction storage area 18 and a data storage area 20. Within instruction storage area 18 is a software module 22 including a set of instructions which, when executed by processor 12, enable processor 12 to simulate fluid flow by the method of the present invention.

Using the appropriate input device 16 (typically a floppy disk drive), source code of software module 22, in a suitable high level language, for numerical simulation of fluid flow according to the present invention, i.e., by extremizing a potential with respect to at most four scalar fields, or by maximizing an action with respect to at most four scalar fields, is loaded into instruction storage area 18. Selecting a suitable language for the instructions of software module 22 is easily done by one ordinarily skilled in the art. The language selected should be compatible with the hardware of system 10, including processor 12, and with the operating system of system 10. Examples of suitable languages include but are not limited to compiled languages such as FORTRAN, C and C++. If a compiled language is selected, a suitable compiler is loaded into instruction storage area 18. Following the instructions of the compiler, processor 12 turns the source code into machine-language instructions, which also are stored in instruction storage area 18 and which also constitute a portion of software module 22. Using the appropriate input device 16 (typically a keyboard), the parameters of the fluid flow problem are entered, and are stored in data storage area 20. Following the machine-language instructions, processor 12 stores the initial values of discrete representations of up to four scalar fields in data storage area 20 and varies those values to extremize the potential, selected from among potentials (4), (5), (6), (7) and (8), that is appropriate to a stationary fluid flow problem, or to maximize the action defined by integrals (9) through (11) and the appropriate Lagrangian functional, selected from among Lagrangian functionals (12) and (13), that is appropriate to a non-stationary fluid flow problem. The results of the extremization are displayed at video monitor 16 or printed on printer 16, preferably in graphical form as in FIGS. 1–4.

It will be appreciated that any of the relevant numerical integration methods known in the art for, for example finite element methods and multi-grid methods, may be used to evaluate the potential functionals of the present invention. Furthermore, as is well known in the art, the coordinate system used need not be Cartesian, but may be curvilinear.

Figure 9:
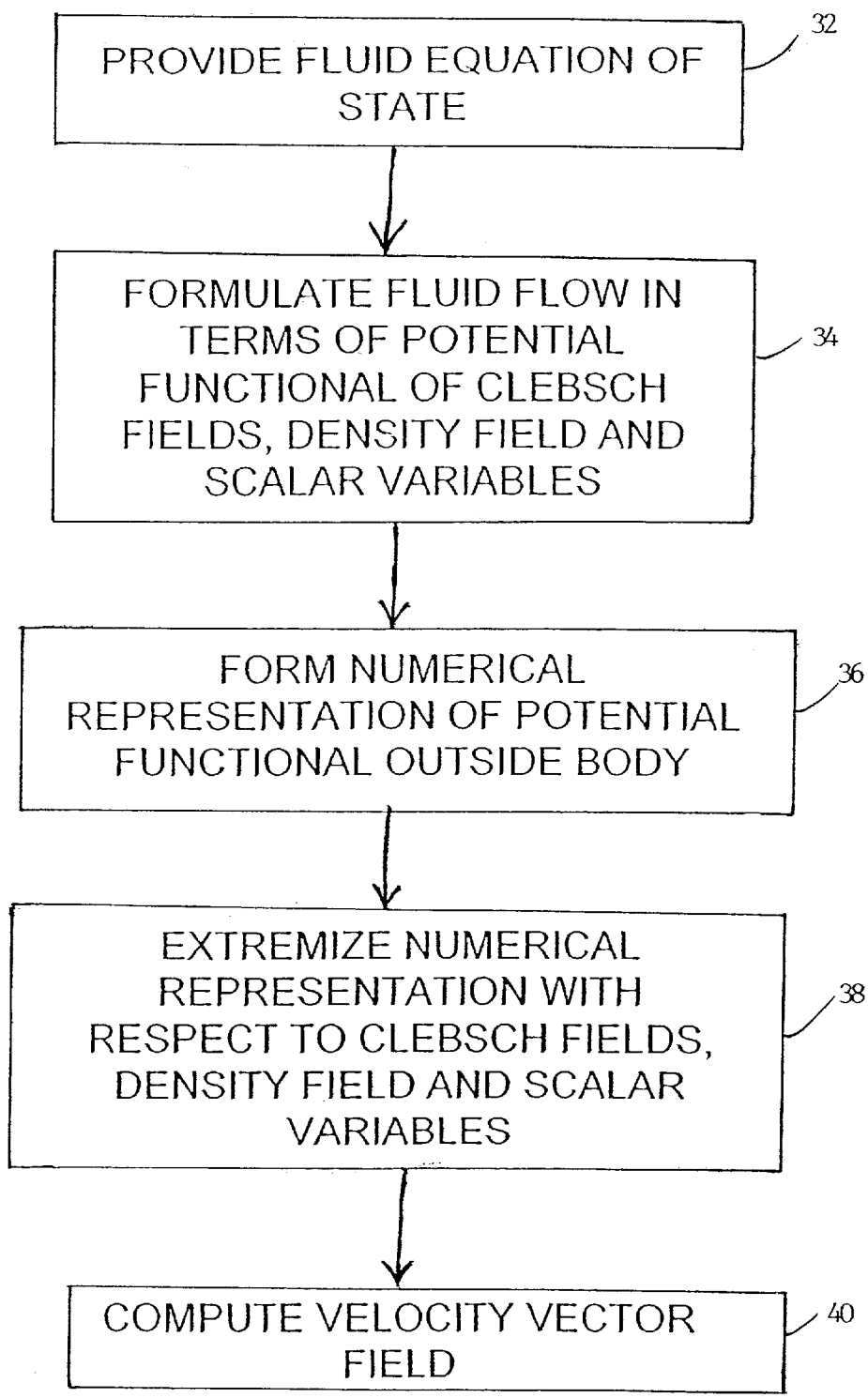
FIGS. 9–13 are flow charts of the method of the present invention.

FIG. 9 is a flow chart of the method of the present invention as applied to the stationary flow of a compressible fluid in the cases of the component of the velocity vector field $\vec{v}$ normal to the region of fluid flow being zero or of the density field ρ on the boundary being zero. In box 32, the equation of state of the fluid is provided. In box 34, the fluid flow is formulated in terms of potential functional (4). In box 36, a numerical representation of potential functional (4) in the region of fluid flow is formed. In box 38, this numerical representation is extremized with respect to the Clebsch fields α, β and v, the density field ρ and the scalar variables $\beta_1$ and $v_1$. In box 40, the velocity vector field $\vec{v}$ is computed.

Figure 10:
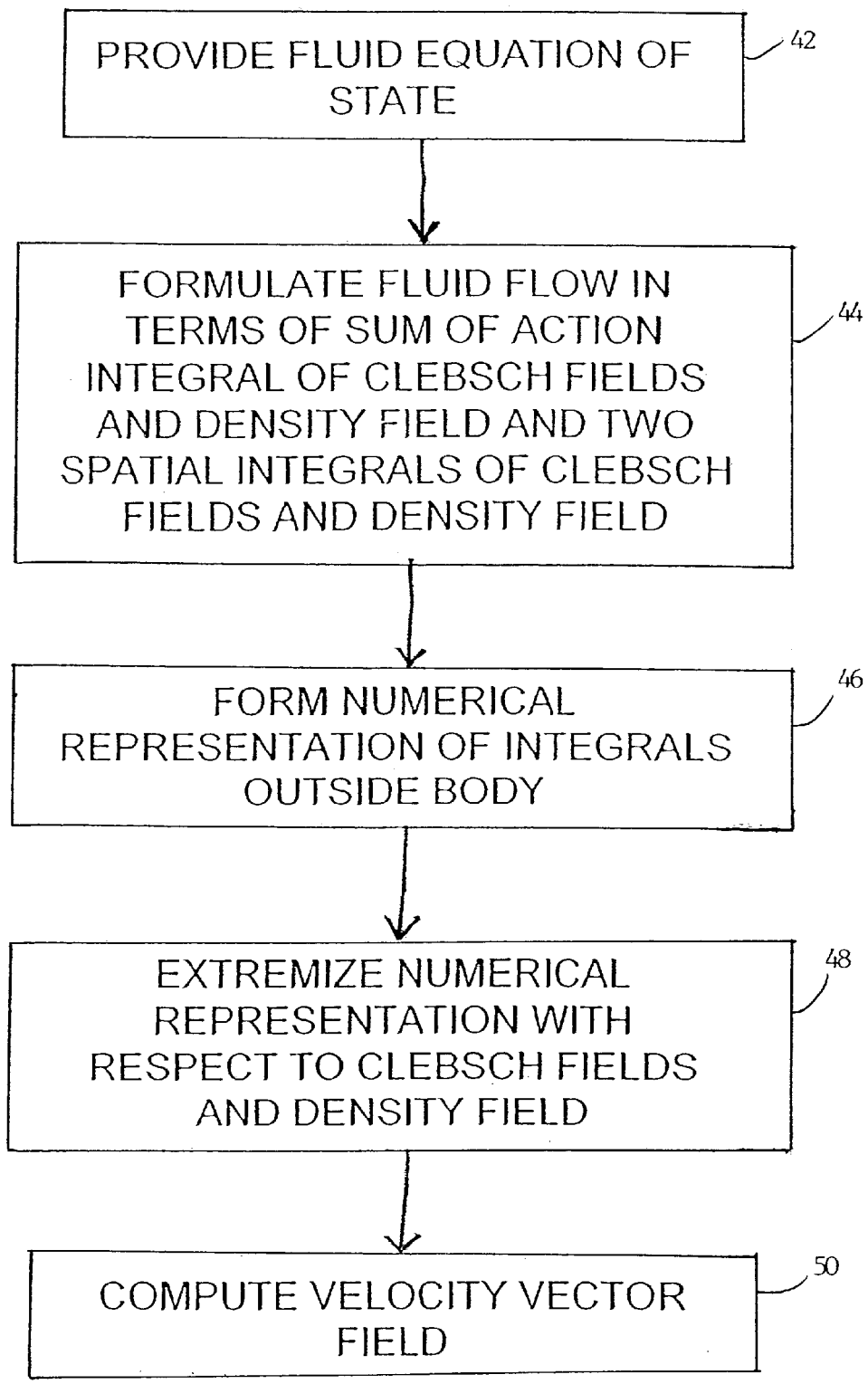

FIG. 10 is a flow chart of the method of the present invention as applied to the non-stationary flow of a compressible fluid in the cases of the component of the velocity vector field $\vec{v}$ normal to the region of fluid flow being zero or of the density field ρ on the boundary being zero. In box 42, the equation of state of the fluid is provided. In box 44, the fluid flow is formulated in terms of action integral (12) and initial and final integrals (10) and (11). In box 46, a numerical representation of action integral (12) and initial and final integrals (10) and (11) in the region of fluid flow is formed. In box 48, this numerical representation is extremized with respect to the Clebsch variables α, β and v and the density field ρ. In box 50, the velocity vector field $\vec{v}$ is computed.

Figure 11:
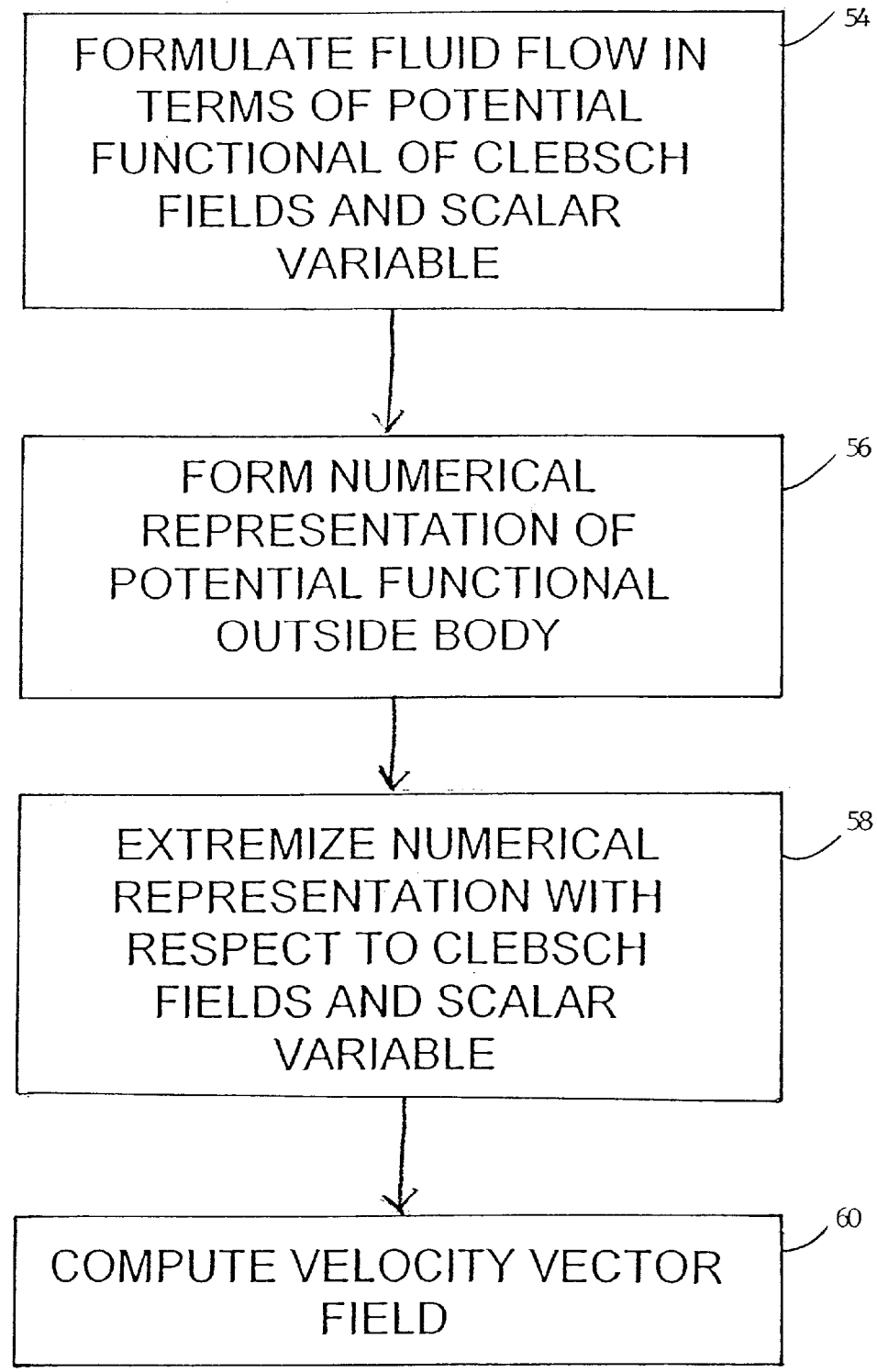

FIG. 11 is a flow chart of the method of the present invention as applied to the stationary flow of an incompressible fluid in the cases of the component of the velocity vector field $\vec{v}$ normal to the region of fluid flow being zero or of the density field ρ on the boundary being zero. In box 54, the fluid flow is formulated in terms of potential functional (5).

In box 56, a numerical representation of potential functional (5) in the region of fluid flow is formed. In box 58, this numerical representation is extremized with respect to the Clebsch fields α, β and ν and the scalar variable $β_1$. In box 60, the velocity vector field $\vec{v}$ is computed.

Figure 12:
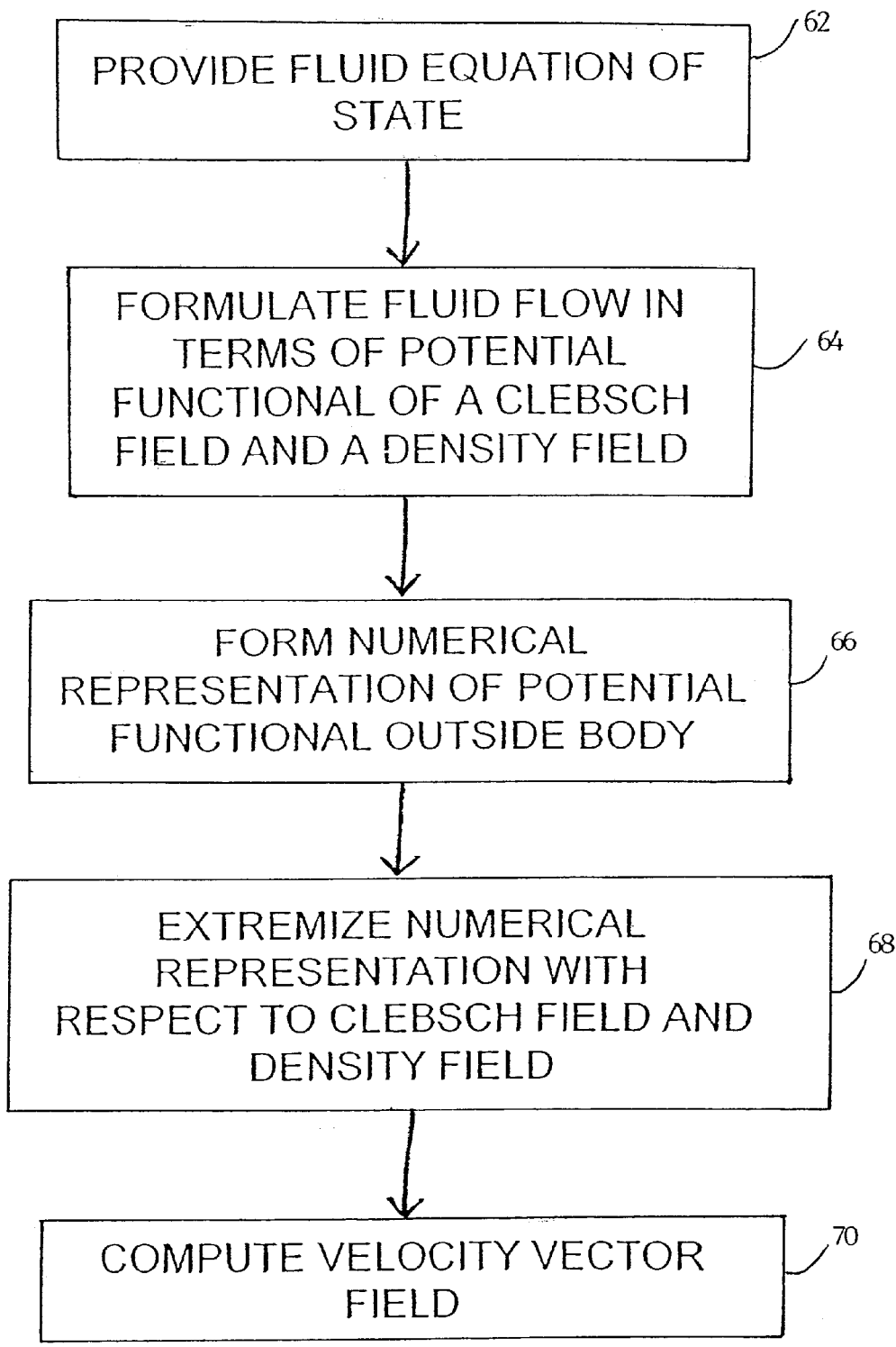

FIG. 12 is a flow chart of the method of the present invention as applied to the stationary potential flow of a compressible fluid. In box 62, the equation of state of the fluid is provided. In box 64, the fluid flow is formulated in terms of potential functional (7). In box 66, a numerical representation of potential functional (7) in the region of fluid flow is formed. In box 68, this numerical representation is extremized with respect to the Clebsch field ν and the density field ρ. In box 70, the velocity vector field $\vec{v}$ is computed.

Figure 13:
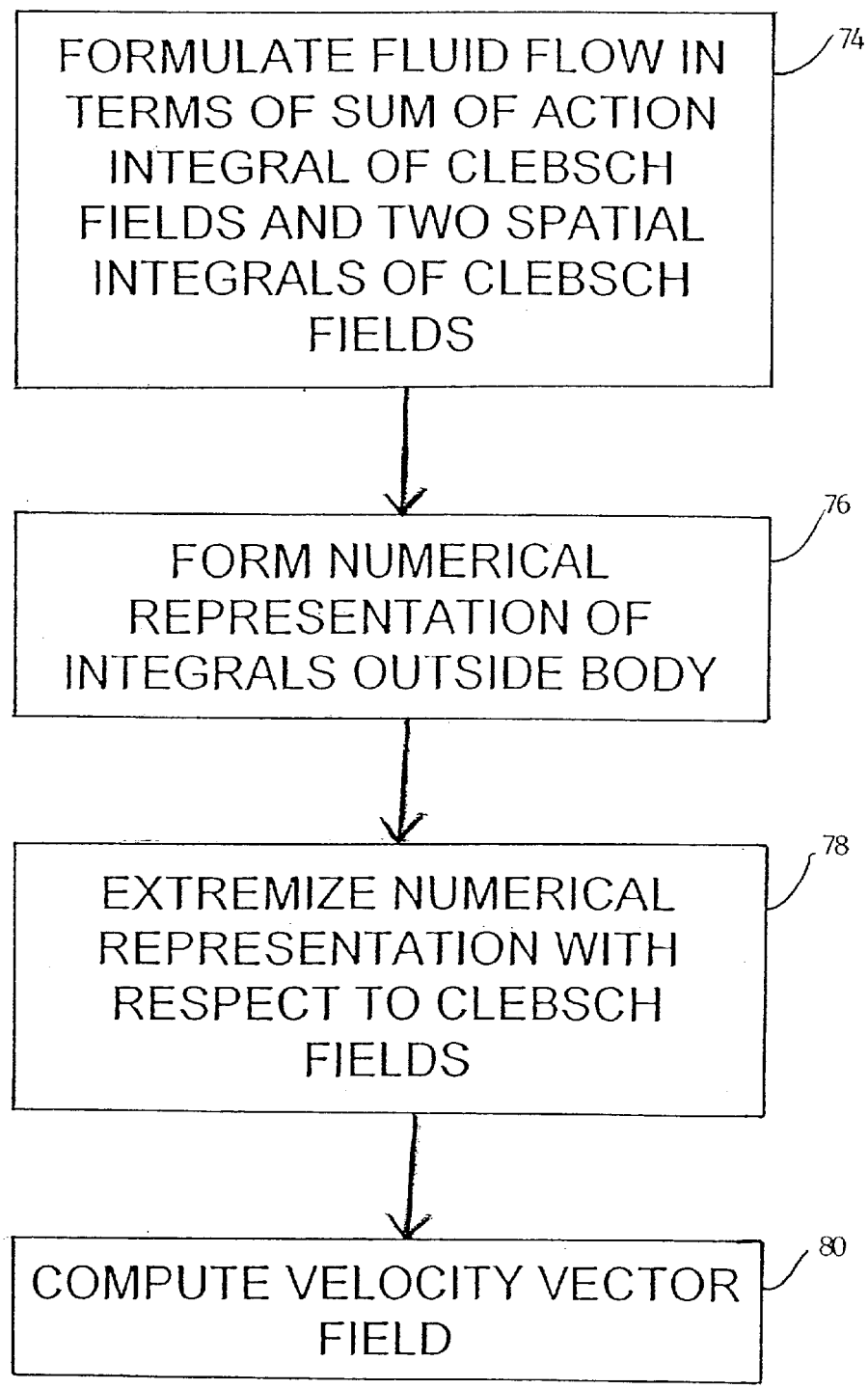

FIG. 13 is a flow chart of the method of the present invention as applied to the non-stationary flow of an incompressible fluid in the cases of the component of the velocity vector field $\vec{v}$ normal to the region of fluid flow being zero or of the density field ρ on the boundary being zero. In box 74, the fluid flow is formulated in terms of action integral (13) and initial and final integrals (10) and (11). In box 76, a numerical representation of action integral (13) and initial and final integrals (10) and (11) in the region of fluid flow is formed. In box 78, this numerical representation is extremized with respect to the Clebsch variables α, β and ν. In box 70, the velocity vector field $\vec{v}$ is computed.

While the invention has been described with respect to a limited number of embodiments, it will be appreciated that many variations, modifications and other applications of the invention may be made.

THEORY

Field and Background of the Method

General Facts and Motivation

The present method relates to calculation of the dynamics of fluids. The dynamics of a flow is important in many technological areas such as aerodynamics, hydrodynamics and other. It is concerned with topics such as the flow of air past an airfoil, the flow of water past a ship's hull and fluid flow in a pipe-line.

The motion of a barotropic fluid is described in the Eulerian approach by the time evolution of the velocity and density fields. The evolution is given by the dynamical Euler equations coupled with the continuity equation as follows:

$$\frac{\partial \vec{v}}{\partial t} + \vec{v} \cdot \vec{\nabla}\vec{v} + \vec{\nabla}(h + \Phi) = 0, \qquad (21)$$

$$\frac{\partial \rho}{\partial t} + \vec{\nabla} \cdot (\rho\vec{v}) = 0. \qquad (22)$$

Where in:

$\vec{v} = \vec{v}(x^k,t)$ is the velocity vector field at a given point $(x^k)=(x,y,z)$ and a given time t.

$\rho=\rho(x^k,t)$ is the scalar density fields at a given point $(x^k)=(x,y,z)$ and a given time t.

$\Phi=\Phi(x_k,t)$ is a potential relating to an external force, typically gravity in a given point $(x^k)=(x,y,z)$ and a given time t.

h is the specific enthalpy which is a given function of ρ for a compressible flow i.e.

$$h = h(\rho) = \int \frac{dP}{\rho} \qquad (23)$$

in which P=P(ρ) is the pressure, the functional dependence of P on ρ is usually designated as the equation of state. For an incompressible flow ρ is assumed to be a constant number $ρ_0$ and $$h = \frac{P}{\rho_0}$$

in which $P=P(x^k,t)$ is the pressure at a given point $(x^k)=(x,y,z)$ and a given time t.

$$\frac{\partial f}{\partial t}$$

is the partial time derivative and $$\vec{\nabla}_k f = \frac{\partial f}{\partial x^k}$$

is the nabla operator whose components are the partial spatial derivatives.

Thus we have to solve four equations in order to obtain four unknown fields: $\vec{v}$,ρ in the case of a compressible flow and $\vec{v}$,P in the case of an incompressible flow. A solution can be obtained given the initial values of those fields and given the appropriate boundary conditions (geometry) of the problem.

For a barotropic compressible flow the nature of the said material has to be specified by an equation of state of the form h=h(ρ). It is assumed that viscosity does not play a major rule in the processes described by the above equations.

In many cases the the flow finally reaches a stationary state. Which can be described by the following equations:

$$\vec{v} \cdot \vec{\nabla}\vec{v} + \vec{\nabla}(h + \Phi) = 0 \qquad (24)$$

$$\vec{\nabla} \cdot (\rho\vec{v}) = 0. \qquad (25)$$

Exact solutions to the time evolution equations are generally unavailable. Rather, the equations must be solved by making simplifying assumptions, by algebraic or numerical approximations or by physical modeling of the relationship specified by the above equation. For example, one or more terms of the equation can be ignored, or solutions can be found by algebraic techniques or by numerical techniques often aided by enormous calculation abilities of a large computer, or a wind tunnel or water trough can be used to visualize what happens when a fluid flows past an object such as an airfoil or ship's hull.

The numerical techniques used involve some method of discretization of the physical fields in space coupled with time integration of the above equations. This method is concerned with a new way to solve the above equations using a variational technique. And a method to obtain stable solutions with out the need to integrate the equations in time and thus enables a considerable reduction of the time and cost of the solution. This in return can reduce the development time of technological systems involving fluids or alternatively enables the developers to explore more possibilities and thus obtain a better technological system.

The Clebsch Representation

An equivalent set to the equations of Euler, describing the flow was given by Clebsch (H. Lamb, *Hydrodynamics* (Dover 1945) p. 248). Clebsch have introduced three scalars $\alpha(x^k,t)$, $\beta(x^k,t)$, $\nu(x^k,t)$ such that:

$$\vec{v} \equiv \alpha \vec{\nabla} \beta + \vec{\nabla} \nu. \tag{26}$$

The above functions will play a major rule in this method. In terms of Clebsch representation one can obtain the following set of Clebsch's transformed equations of fluid dynamics:

$$\frac{\partial \rho}{\partial t} + \vec{\nabla} \cdot (\rho \vec{v}) = 0 \tag{27}$$

$$\frac{D\alpha}{Dt} = 0 \tag{28}$$

$$\frac{D\beta}{Dt} = 0 \tag{29}$$

$$\frac{D\nu}{Dt} = \frac{1}{2}\vec{v}^2 - h - \Phi. \tag{30}$$

In which the velocity $\vec{v}$ is given now by the Clebsch representation (equation (26)) and the operator $$\frac{D}{Dt}$$

is defined such that:

$$\frac{D}{Dt} \equiv \frac{\partial}{\partial t} + \vec{v} \cdot \vec{\nabla}.$$

The Variational Principle

It is well known that a representation of a physical problem in terms of a variational principle can lead to a better understanding the problem (H. Goldstein, *Classical Mechanics* (1980)). Moreover, a variational principle combined with a numerical technique can lead to improved solutions, especially for complicated geometries. Therefore a few attempts have been to formulate Eulerian fluid dynamics in terms of a variational principle. See for example Herivel J. W. 1955 *Proc. Camb. Phil. Soc.*, 51, 344, Serrin J. 1959, *'Mathematical Principles of Classical Fluid Mechanics'* in *Handbuch der Physik*, 8, 148, Lin C. C. 1963, *'Liquid Helium'* in *Proc. Int. School Phys. XXI* (Academic Press) and Seliger R. L. & Whitham, G. B. 1968, *Proc. Roy. Soc. London*, A305, 1. However, the variational principles developed by the above authors are very cumbersome containing quite a few "Lagrange multipliers" and "potentials". The range of the total number of independent functions in the above formulations ranges from eleven to seven which exceeds by many the four functions appearing in the Eulerian and continuity equations of a barotropic flow. And therefore did not have any practical use or applications.

The inventor introduces the following variational principles with only four independent functions in term of Clebsch variables. For a compressible flow the said variational principle is given in terms of the action A and the Lagrangian L which are given respectively by the following time and volume integrals:

$$A_c \equiv \int_{t_0}^{t_1} L_c \, dt \text{ with} \tag{31}$$

$$L_c \equiv \int_V \left[ -\left(\alpha \frac{\partial \beta}{\partial t} + \frac{\partial \nu}{\partial t}\right) - \frac{1}{2}(\alpha \vec{\nabla} \beta + \vec{\nabla} \nu)^2 - \varepsilon(\rho) - \Phi \right] \rho \, d^3x.$$

In which $\epsilon(\rho)$ is the specific internal energy related to the specific enthalpy by:

$$h = \frac{\partial(\rho \varepsilon)}{\partial \rho}. \tag{32}$$

Taking the variation $\delta A_c$ to be zero with respect to $\alpha,\beta,\nu,\rho$ we obtain the Clebsch equations (27–30), provided that the boundary and initial conditions are satisfied. Boundary conditions have to be specified such that the normal components of $\vec{v}$ vanish relative to the solid surface of a vessel containing the flow, or such that the density $\rho$ vanishes on a free surface. For more complex boundary conditions a more involved Lagrangian is needed as will be discussed later.

In the case of an incompressible flow the specific enthalpy h is not considered a function of the density $\rho$ but rather a Lagrange multiplier. In this case the action A is slightly modified and takes the form:

$$A_i \equiv \int_{t_0}^{t_1} L_i \, dt \text{ with} \tag{33}$$

$$L_i \equiv \int_V \left[ -\left(\alpha \frac{\partial \beta}{\partial t} + \frac{\partial \nu}{\partial t}\right) - \frac{1}{2}(\alpha \vec{\nabla} \beta + \vec{\nabla} \nu)^2 - \Phi \right] \rho \, d^3x - \int_V h(\rho - \rho_0) d^3x.$$

Taking the variation $\delta A$ to be zero with respect to $\alpha,\beta,\nu,\rho$ we obtain again the Clebsch equations (27–30). Provided that the boundary and initial conditions are satisfied. Boundary conditions have to be specified such that the normal components of $\vec{v}$ vanish relative to the solid surface of a vessel containing the flow. Furthermore we obtain by taking the variation of A with respect to h the equation:

$$\rho - \rho_0 = 0 \tag{34}$$

which states that the density of the flow is constant and equals $\rho_0$.

Alternatively one can take in advance $\rho = \rho_0$ and obtain a reduced variational principle:

$$A_{ir} \equiv \int_{t_0}^{t_1} L_{ir} \, dt \text{ with} \tag{35}$$

$$L_{ir} \equiv \int_V \left[ -\left(\alpha \frac{\partial \beta}{\partial t} + \frac{\partial \nu}{\partial t}\right) - \frac{1}{2}(\alpha \vec{\nabla} \beta + \vec{\nabla} \nu)^2 - \Phi \right] \rho_0 d^3x.$$

In this case the variational principle allows us to obtain Clebsch equations (27–29). The specific enthalpy h can be calculated using equation (30) to be:

$$h = \frac{1}{2}\vec{v}^2 - \frac{D\nu}{Dt} - \Phi \tag{36}$$

or in terms of pressure:

$$P = \rho_0 \left( \frac{1}{2} \vec{v}^2 - \frac{Dv}{Dt} - \Phi \right) \quad (37)$$

For some calculations of incompressible flows this variational technique is preferable since it involves less functions, while the pressure calculation is a simple substitution.

The Case of General Boundary Conditions

In many practical flows of small viscosity which are described by Euler or Clebsch equations the boundary conditions given above are not satisfied. That is the normal components of $\vec{v}$ do not vanish relative to the surface of a volume containing or contained inside the flow, nor does the density $\rho$ vanish on those surfaces. In many flows the small viscosity assumption, is only satisfied in part of the volume containing the flow. Such as flow around an air-craft in which we have a viscous "boundary layer" region close to the air-craft, surrounded by a volume of small viscosity flow. More over, some times we are not interested in solving the equations in all the fluid volume. Such is the case of a wind tunnel in which we have a constant velocity U flow coming from minus "infinity" and hitting some object going back to a constant velocity U at "infinity". In this case we are only interested in a finite section of the wind tunnel containing the object under study in which the boundary conditions on the planes confining this volume is given such that the normal component of the velocity vector $\vec{v}$ is equal to U.

In order that the variational principle will describe flows of practical importance we add to it the following boundary term:

$$L_B = \oint_B (\alpha_B \beta + v) \rho_B \vec{v}_B \cdot d\vec{S} \quad (38)$$

The integral is taken on the boundary surface of the flow under consideration. The values of the functions $\alpha_B, \rho_B$ and the component of $\vec{v}_B$ normal to the surface are given in advance. The total Lagrangian for a compressible flow is:

$$L_{gc} = L_c + L_B \quad (39)$$

for which $L_c$ is given by equation (31). For incompressible flows the total Lagrangian is given by:

$$L_{gi} = L_i + L_B \quad (40)$$

in which $L_i$ is given by by equation (33) and $\rho_B$ is set to $\rho_B = \rho_0$. For the reduced incompressible Lagrangian we obtain:

$$L_{gir} = L_{ir} + L_B. \quad (41)$$

Of course for simple boundary conditions that is for $\rho_B = 0$ or $\vec{v}_B$ zero normal to the boundary, $L_B$ is null.

Steady Flows

Let us consider the case of a steady flow in which the velocity $\vec{v}$ and the density $\rho$ are time independent. This does not mean that the three scalars $\alpha, \beta, v$ are time independent also, but rather that they have a special dependence on time. Under very general conditions it can be shown that for steady flows:

$$\alpha = \hat{\alpha}(x^k)$$

$$\beta = \hat{\beta}(x^k) - \beta_1 t$$

$$v = \hat{v}(x^k) - v_1 t \quad (42)$$

in which $\hat{\alpha}, \hat{\beta}, \hat{v}$ are spatial functions and $\beta_1, v_1$ are constants. Inserting the above expressions into Clebsch equations (27–30): we obtain the following steady Clebsch equations:

$$\vec{\nabla} \cdot (\rho \vec{v}) = 0 \quad (43)$$

$$\vec{v} \cdot \vec{\nabla} \hat{\alpha} = 0 \quad (44)$$

$$\vec{v} \cdot \vec{\nabla} \hat{\beta} = \beta_1 \quad (45)$$

$$\hat{\alpha} \beta_1 + v_1 = \frac{1}{2} \vec{v}^2 + h + \Phi. \quad (46)$$

It can be seen that $\alpha$ is linear in the famous Bernoulli constant $B \equiv \frac{1}{2}\vec{v}^2 + h + \Phi$.

The Potential of a Flow

The Lagrangians for compressible and incompressible flows given in equations (39,40) are made of two major parts:

$$L_{gc} = T - U_c, \quad L_{gi} = T - U_i. \quad (47)$$

One is the "kinetic" part containing time derivatives:

$$T = \int_V -\left( \alpha \frac{\partial \beta}{\partial t} + \frac{\partial v}{\partial t} \right) \rho d^3 x \quad (48)$$

and the other is the "potential" part given below for the compressible case by:

$$U_c = \int_V \left[ \frac{1}{2} (\alpha \vec{\nabla} \beta + \vec{\nabla} v)^2 + \varepsilon(\rho) + \Phi \right] \rho d^3 x + \oint_B (\alpha_B \beta + v) \rho_B \vec{v}_B \cdot d\vec{S} \quad (49)$$

and for the incompressible case by:

$$U_i = \int_V \left[ \frac{1}{2} (\alpha \vec{\nabla} \beta + \vec{\nabla} v)^2 + \Phi \right] \rho d^3 x + \int_V h(\rho - \rho_0) d^3 x + \oint_B (\alpha_B \beta + v) \rho_0 \vec{v}_B \cdot d\vec{S}. \quad (50)$$

It is well known the minimum of the potential is a stable steady solution of the dynamical equations of the system. In this case if we equate the variation of either $U_i$ or $U_c$ with respect to $\alpha, \beta, v, \rho$ to zero, we obtain the following equations:

$$\vec{\nabla} \cdot (\rho \vec{v}) = 0 \quad (51)$$

$$\vec{v} \cdot \vec{\nabla} \alpha = 0 \quad (52)$$

$$\vec{v} \cdot \vec{\nabla} \beta = 0 \quad (53)$$

$$\frac{1}{2} \vec{v}^2 + h + \Phi = 0. \quad (54)$$

This equations are absurd since for example we can have an external potential $\Phi = 0$ which entails both $\vec{v} = 0$ and $h = 0$, that is the only steady flow is a static flow. More over we can choose $\Phi$ to be a big negative constant this will not cause any change in the solution of the Euler equations with respect to the case $\Phi = 0$ since those equations depend only on the gradient of $\Phi$. But will disable any real solution of the above equations . This difficulties will be resolved in the following paragraph by constructing a different potential functional using the Clebsch variables for steady flow given in equation (42).

The Potential of a Steady Flow

Let us insert the scalars given in equation (2) into the Lagrangian of the compressible flow given in equation (9) and assume that $L_B=0$:

$$L_{gsc} \equiv \int_V \left[(\hat{\alpha}\beta_1 + v_1) - \frac{1}{2}(\hat{\alpha}\vec{\nabla}\hat{\beta} + \vec{\nabla}\hat{v})^2 - \varepsilon(\rho) - \Phi\right]\rho d^3 x, \quad (55)$$

we are reminded that when $L_B=0$ either the velocity $\vec{v}$ normal to the boundary is zero or $\rho=0$ on the boundary.

The negative of $L_{gac}$ can also be written as:

$$-L_{gac} = V_c - \beta_1 \int_V \hat{\alpha}\rho d^3 x - v_1 \int_V \rho d^3 x \quad (56)$$

$$V_c \equiv \int_V \left[\frac{1}{2}(\hat{\alpha}\vec{\nabla}\hat{\beta} + \vec{\nabla}\hat{v})^2 + \varepsilon(\rho) + \Phi\right]\rho d^3 x.$$

by varying the Lagrangian given in equation (55) with respect to $\hat{\alpha},\hat{\beta},\hat{v},\rho$ we obtain the equations (43–46). Furthermore from equation (56) we see that $-L_{gac}$ is essentially the potential part of the L with additional terms which can be interpreted as Lagrange multipliers constraining the mass integral:

$$M = \int_V \rho d^3 x \quad (57)$$

and the integral:

$$J = \int_V \alpha \rho d^3 x. \quad (58)$$

Let us inquire if this interpretation is justified.

The time evolution of the mass M can be deduced from the continuity equation (27) which is integrated over the volume such that:

$$\frac{\partial M}{\partial t} = \frac{\partial \int_V \rho d^3 x}{\partial t} = -\int_V \vec{\nabla}\cdot(\rho\vec{v}) d^3 x = -\oint_S \rho\vec{v}\cdot d\vec{S} \quad (59)$$

Thus if the normal component of $\vec{v}$ vanish on the surface S, or the density $\rho$ vanishes on the same surface the mass M remains constant. That is if there is no mass transport over the surface the total mass is conserved. And thus it is justified from a physical point of view to keep M constant while varying $L_{gac}$ with respect to time independent functions since if we take the surface S the be the boundary of the fluid then the conditions for constant M are satisfied.

Similarly by combining equation (27) and equation (28) we obtain:

$$\frac{\partial(\alpha\rho)}{\partial t} + \vec{\nabla}\cdot(\alpha\rho\vec{v}) = 0. \quad (60)$$

This can be volume integrated, and we obtain:

$$\frac{\partial J}{\partial t} = \frac{\partial \int_V \alpha\rho d^3 x}{\partial t} = -\int_V \vec{\nabla}\cdot(\alpha\rho\vec{v}) d^3 x = -\oint_S \alpha\rho\vec{v}\cdot d\vec{S} \quad (61)$$

Thus if the normal component of $\vec{v}$ vanish on the surface S, or the density $\rho$ or $\alpha$ becomes zero on the same surface, then J remains constant. That is if there is no transport of $\alpha\rho$ over the surface then J is conserved. And thus it is justified from a physical point of view to keep J constant while varying $L_{gac}$ with respect to time independent functions since if we take the surface S the be the boundary of the fluid then the conditions for constant J are satisfied.

Taking the variation of $-L_{gac}$ with respect to $\beta_1, v_1$ leads to the absurd result that $M=0$ and $J=0$. However, $-L_{gac}$ can easily be amended without changing the flows equations and thus we obtain the following functional:

$$V_{tc} = V_c - \beta_1\left(\int_V \hat{\alpha}\rho d^3 x - \overline{\alpha}M_0\right) - v_1\left(\int_V \rho d^3 x - M_0\right) \quad (62)$$

in which $M_0$ and $\overline{\alpha}$ are constants dependent on the initial condition of the flow. $V_{tc}$ is the total potential which includes the original potential part of $L_{gc}$ and additional Lagrange multipliers which take care of the conservation of the mass M and J. The extremum of $V_{tc}$ with respect to $\hat{\alpha},\hat{\beta},\hat{v},\rho$ satisfies the steady Clebsch equations and the minima of $V_{tc}$ is a stable steady flow. Taking the extremum of $V_{tc}$ with respect to $\beta_1$ and $v_1$ assures that the final flow configuration contains the same amount of mass $M_0$ and average alpha $\overline{\alpha}$ as the initial configuration. However, the extremum point with respect to $\beta_1$ and $v_1$ is not a minimal point with respect to those variables rather it is a maximal point. Thus the extremum of $V_{tc}$ is a saddle point with respect to all its variables.

The same goes for an incompressible flow for which:

$$V_{ti} = V_i - \beta_1\left(\int_V \hat{\alpha}\rho d^3 x - \overline{\alpha}M_0\right) - v_1\left(\int_V \rho d^3 x - M_0\right) \quad (63)$$

but $V_i$ is now given by:

$$V_i = \int_V \left[\frac{1}{2}(\hat{\alpha}\vec{\nabla}\hat{\beta} + \vec{\nabla}\hat{v})^2 + \Phi\right]\rho d^3 x + \int_V h(\rho - \rho_0) d^3 x. \quad (64)$$

In the reduced formalism for incompressible flows we obtain:

$$V_{tir} = V_{ir} - \beta_1\left(\int_V \hat{\alpha}\rho_0 d^3 x - \overline{\alpha}M_0\right) \quad (65)$$

in which $V_{ir}$ is given by:

$$V_{ir} = \int_V \left[\frac{1}{2}(\hat{\alpha}\vec{\nabla}\hat{\beta} + \vec{\nabla}\hat{v})^2 + \Phi\right]\rho_0 d^3 x. \quad (66)$$

In order to obtain the final stable stationary configuration of given flow, one need not integrate the fluid dynamical equations in the dimension of time. Instead one can disregard time evolution altogether and obtain the final stable result searching for local minima of the total potential with respect to $\hat{\alpha},\hat{\beta},\hat{v},\rho$ for compressible flows, with respect to $\hat{\alpha},\hat{\beta},\hat{v},\rho$, h in the incompressible ordinary case. Or with respect to: $\hat{\alpha},\hat{\beta},\hat{v}$ in the reduced incompressible case. And for the maximal point of the total potential with respect to $\beta_1, v_1$. All in the vicinity of the initial configuration. In the case of the reduced incompressible case the pressure is calculated through equation (46):

$$P = \rho_0 \left( \hat{\alpha}\beta_1 + v_1 - \frac{1}{2}\vec{v}^2 - \Phi \right). \tag{67}$$

The constant $v_1$ is an arbitrary constant and does not appear in the potential functional.

The Potential of a Steady Flow with General Boundary Conditions

Under more general boundary conditions the normal component of $\vec{v}$ does not vanish on the boundary nor does the density $\rho$. The quantities M and J are in general not conserved. Thus in general $\beta_1, v_1$ can not be considered as Lagrange multipliers. It can be shown that those numbers can be set in advance for flows with $\hat{\alpha}, \hat{\beta}$ which are not identically zero, to the values:

$$\beta_1 = 1, v_1 = 0, \tag{68}$$

with out restricting the generality of the physical flow. The steady Clebsch equations become:

$$\vec{\nabla} \cdot (\rho \vec{v}) = 0 \tag{69}$$

$$\vec{v} \cdot \vec{\nabla} \hat{\alpha} = 0 \tag{70}$$

$$\vec{v} \cdot \vec{\nabla} \hat{\beta} = 1 \tag{71}$$

$$\hat{\alpha} = \frac{1}{2}\vec{v}^2 + h + \Phi \tag{72}$$

that is $\hat{\alpha}$ becomes the Bernoulli constant.

Inserting the values of $\beta_1 = 1$ and $v_1 = 0$ into equation (56) the potential functional of the compressible flow will take the form:

$$V_{tgc} \equiv \int_V \left[ -\hat{\alpha} + \frac{1}{2}(\hat{\alpha}\vec{\nabla}\hat{\beta} + \vec{\nabla}\hat{v})^2 + \varepsilon(\rho) + \Phi \right] \rho d^3x + V_B, \tag{73}$$

in which we added the term $V_B$ which can not be ignored in the case of general boundary conditions. $V_B$ can be taken from equation (38):

$$V_B \equiv \oint_B (\alpha_B \hat{\beta} + \hat{v}) \rho_B \vec{v}_B \cdot d\vec{S}. \tag{74}$$

Likewise the potential functional for am incompressible flow is given by:

$$V_{tgi} \equiv \int_V \left[ -\hat{\alpha} + \frac{1}{2}(\hat{\alpha}\vec{\nabla}\hat{\beta} + \vec{\nabla}\hat{v})^2 + \Phi \right] \rho d^3x + \int_V h(\rho - \rho_0) d^3x + V_B. \tag{75}$$

And for the reduced potential functional we obtain:

$$V_{tgir} \equiv \int_V \left[ -\hat{\alpha} + \frac{1}{2}(\hat{\alpha}\vec{\nabla}\hat{\beta} + \vec{\nabla}\hat{v})^2 + \Phi \right] \rho_0 d^3x + V_B. \tag{76}$$

Again in order to obtain the final stable stationary configuration of given flow, one need not integrate the fluid dynamical equations in the dimension of time. Instead one can disregard time evolution altogether and obtain the final stable result searching for local minima of the total potential with respect to $\hat{\alpha}, \hat{\beta}, \hat{v}, \rho$ (and also h for the incompressible case). In the reduced incompressible case we need to search only for the local minima with respect to $\hat{\alpha}, \hat{\beta}, \hat{v}$ in the vicinity of of the initial configuration.

The Problem of Initial Configuration

The initial configuration of a compressible fluid is given by the velocity $\vec{v}$ and density $\rho$. For an incompressible fluid it is given by the velocity $\vec{v}$, the uniform density $\rho_0$ and the specific enthalpy h. However, in order to implement either the variational time dependent technique or the potential minimization technique we need to express the velocity $\vec{v}$ in terms of the Clebsch variables $\alpha, \beta, \nu$. Of course the other way around is straight forward through the Clebsch representation (equation (26)). If $\alpha, \beta, \vec{v}$ are known we can calculate $\nu$ using equation (26) by:

$$\vec{\nabla}\nu = \vec{v} - \alpha \vec{\nabla}\beta, \tag{77}$$

Or by:

$$\nu(\vec{r}) = \nu(\vec{r}_0) + \int_{\vec{r}_0}^{\vec{r}} (\hat{v} - \alpha \vec{\nabla}\beta) \cdot d\vec{r}, \quad \vec{r} = (x, y, z). \tag{78}$$

It remains to obtain $\alpha, \beta$. $\alpha$ can be taken to be Bernoulli's constant:

$$\alpha = \beta = \frac{1}{2}\vec{v}^2 + h + \Phi. \tag{79}$$

As for $\beta$ it can be obtained in the following way: first take the rotor of equation (26) such that the vorticity $\vec{\omega}$ is obtained in terms of $\alpha, \beta$:

$$\vec{\omega} = \vec{\nabla} \times \vec{v} = \vec{\nabla}\alpha \times \vec{\nabla}\beta. \tag{80}$$

this can be solved for $\beta$ such that:

$$\vec{\nabla}\beta = \vec{A} \equiv \frac{\vec{\omega} \times \vec{\nabla}\alpha}{|\vec{\nabla}\alpha|^2} = \frac{\vec{v}\omega^2 - \vec{\omega}(\vec{v} \cdot \vec{\omega})}{\vec{v}\omega^2 - \vec{\omega}(\vec{v} \cdot \vec{\omega})^2} \tag{81}$$

in which we have used the well known Bernoulli identity:

$$\vec{v} \times \vec{\omega} = \vec{\nabla}\left(\frac{1}{2}\vec{v}^2 + h + \Phi\right) = \vec{\nabla}\hat{\alpha} \tag{82}$$

which is true for any steady flow. Provided that:

$$\vec{\nabla} \times \vec{A} = 0. \tag{83}$$

$\beta$ can be than calculated by:

$$\beta(\vec{r}) = \beta(\vec{r}_0) + \int_{\vec{r}_0}^{\vec{r}} \vec{A} \cdot d\vec{r}. \tag{84}$$

For the two dimensional case the vector $\vec{A}$ takes even a simpler form:

$$\vec{A} \equiv \frac{\vec{v}}{v^2} \tag{85}$$

It appears that for most simple flows which serve as initial conditions equation (83) is satisfed, however, for some special cases for which equation (83) is not satisfied equa tion (80) may be solved iteratively in order to obtain the initial value for $\beta$. First set:

$$\beta^0 = \beta, \vec{\omega}^0 = \vec{\omega}, \vec{A}^0 = \vec{A}. \tag{85}$$

Now we assume that:

$$\vec{\nabla} \times \vec{A}^0 \neq 0, \tag{87}$$

otherwise the solution is given in equation (84). The solution if exists is given by:

$$\vec{\nabla} \beta^0 = \vec{A}^0 + \beta^1 \vec{\nabla} \alpha, \tag{88}$$

in which $\beta^1$ is any function. Since the rotational of the left side of the above equation is zero, so is the rotational of right hand side:

$$0 \vec{\nabla} \times \vec{A}^0 + \vec{\nabla} \beta^1 \times \vec{\nabla} \alpha. \tag{89}$$

Which can be rewritten as:

$$\omega^1 \equiv \vec{\nabla} \times \vec{A}^0 = \vec{\nabla} \alpha \times \vec{\nabla} \beta^1. \tag{90}$$

Comparing this equation with equation (80) we see that we have obtained the same equation for $\beta^1$ as for $\beta^0$. Thus it can be solved in the same way:

$$\vec{\nabla} \beta^1 = \vec{A}^1 + \beta^2 \vec{\nabla} \alpha,$$

$$\vec{A}^1 \equiv \frac{\vec{\omega}^1 \times \vec{\nabla} \alpha}{|\vec{\nabla} \alpha|^2} \tag{91}$$

If $\vec{\nabla} \times \vec{A}^1 = 0$ then $\beta^2 = 0$ and:

$$\beta^1(\vec{r}) = \beta^1(\vec{r}_0) + \int_{\vec{r}_0}^{\vec{r}} \vec{A}^1 \cdot d\vec{r}. \tag{92}$$

Other wise we need to repeat the process for $\beta^2$. In general after n iterations we have:

$$\vec{\nabla} \beta^n = \vec{A}^n + \beta^{n+1} \vec{\nabla} \alpha, \tag{93}$$

$$\vec{A}^n \equiv \frac{\vec{\omega}^n \times \vec{\nabla} \alpha}{|\vec{\nabla} \alpha|^2}.$$

The hope is that for some n=N we will obtain $\vec{A}^N$ such that $\vec{\nabla} \times \vec{A}^N = 0$. In that case: $\beta^{N+1}$ can be taken to zero and the iterative process is terminated. In simple initial flows, however, step zero of this process is enough.

The Case of Potential Flows

Flows with an initial velocity field such that:

$$\vec{\omega} = \vec{\nabla} \times \vec{v}_0 \tag{94}$$

are denoted as "potential" flows in this case:

$$\vec{v} = \vec{\nabla} v \tag{95}$$

and $$v(\vec{r}) = v(\vec{r}_0) + \int_{\vec{r}_0}^{\vec{r}} \vec{v} \cdot d\vec{r}. \tag{96}$$

It is a well known fact in the theory of fluid dynamics that a flow of zero vorticity: $\vec{\omega} = 0$ will remain in this situation, in this case $\alpha, \beta$ can be ignored in the action principle as well. In the compressible case the action takes the form of:

$$A_{pc} = \int_{t_0}^{t_1} L_{pc} \, dt \text{ with} \tag{97}$$

$$L_{pc} = \int_V \left[ -\frac{\partial v}{\partial t} - \frac{1}{2}(\vec{\nabla} v)^2 - \varepsilon(\rho) - \Phi \right] \rho d^3 x + \oint_B v \rho_B \vec{v}_B \cdot d\vec{S}.$$

While in the incompressible case the action takes the form of:

$$A_{pi} = \int_{t_0}^{t_1} L_{pi} \, dt \text{ with} \tag{98}$$

$$L_{pc} = \int_V \left[ -\frac{\partial v}{\partial t} - \frac{1}{2}(\vec{\nabla} v)^2 - \Phi \right] \rho d^3 x - \int_V h(\rho - \rho_0) d^3 x + \oint_B v \rho_0 \vec{v}_B \cdot d\vec{S}.$$

In the reduced incompressible case the action takes the form of:

$$A_{pir} = \int_{t_0}^{t_1} L_{pir} \, dt \text{ with} \tag{99}$$

$$L_{pir} = \int_V \left[ -\frac{\partial v}{\partial t} - \frac{1}{2}(\vec{\nabla} v)^2 - \Phi \right] \rho_0 d^3 x + \oint_B v \rho_0 \vec{v}_B \cdot d\vec{S}.$$

There are only two equations describing the dynamics of a potential flow:

$$\frac{\partial \rho}{\partial t} + \vec{\nabla} \cdot (\rho \vec{v}) = 0 \tag{100}$$

$$\frac{Dv}{Dt} = \frac{1}{2}(\vec{\nabla} v)^2 - h - \Phi. \tag{101}$$

The first of those equations is the continuity equation, while the second is Bernoulli's equation. In addition we have also equation (34) for incompressible flows which states that the density is constant.

In the case of null mass flow into the volume of interest, we obtain the following total potential functional for compressible flows:

$$V_{tpc} = V_{pc} - v_1 \left( \int_V \rho d^3 x - M_0 \right) \tag{102}$$

in which $V_{pc}$ is given by:

$$V_{pc} = \int_V \left[ \frac{1}{2}(\vec{\nabla} \hat{v})^2 + \varepsilon(\rho) + \Phi \right] \rho d^3 x. \tag{103}$$

For incompressible flows the total potential functional is given by:

$$V_{tpi} = V_{pi} - v_1 \left( \int_V \rho d^3 x - M_0 \right) \quad (104)$$

in which:

$$V_{pi} = \int_V \left[ \frac{1}{2} (\vec{\nabla} \hat{v})^2 + \Phi \right] \rho d^3 x + \int_V h(\rho - \rho_0) d^3 x. \quad (105)$$

We may also obtain a reduced potential functional for incompressible flows in the simple form:

$$V_{pir} = \int_V \left[ \frac{1}{2} (\vec{\nabla} \hat{v})^2 + \Phi \right] \rho_0 d^3 x. \quad (106)$$

The equations of steady flow become:

$$\vec{\nabla} \cdot (\rho \vec{\nabla} \hat{v}) = 0 \quad (107)$$

$$v_1 = \frac{1}{2} (\vec{\nabla} \hat{v})^2 + h + \Phi. \quad (108)$$

The second equation is Bernoulli's equation for steady flows. In the case of mass flow into the volume, the potential flow can not stay steady.

Some Examples of Steady Flows

Consider a long and wide cylindrical wind tunnel such that the velocity of flow $\vec{v} = u\hat{y}$ is constant in time and space all over the cylinder which is confined between two planes. The Y-axis is chosen to be in the direction of flow and $\hat{y}$ is a unit vector in the Y-direction. According to equation (80) the initial vorticity $\vec{\omega}$ is zero, and thus the initial flow is a "potential" flow with v given by:

$$v = uy \quad (109)$$

The initial density is assumed to be $\rho = \rho_0$ and the equation of state is assumed to be that of an ideal gas:

$$P(\rho) = k\rho, \quad h(\rho) = k \ln \frac{\rho}{\rho_0} \quad (110)$$

where k is some constant. From the above we see that the boundary condition for this flow is such that the velocity vanishes normal to the transverse walls $\vec{v}_B = 0$ of the cylinder but is equal to $\vec{v}_B \cdot \hat{y} = u$ on the confining planes. $\rho_B = \rho_0$ on all bounding surfaces. And $\alpha_B = 0$ since there is no vorticity. Thus we have a problem with "general" type of boundary conditions. Notice however, that the mass is conserved since the mass flux $\rho \vec{v}$ is equal in both confining planes.

Next we introduce a solid body into the wind tunnel the body can be simple—a sphere for which an analytic solution can be found in text books. Or it can be very complicated such as the solid bodies of realistic air crafts for which methods such as the one introduced in this article should be used. The presence of the body introduces new boundary conditions on the surfaces which confine the body. The simplest of those conditions is that the velocity $\vec{v}$ normal to the boundary vanishes. Now according to well known theorems of fluid dynamics a flow which is of a "potential" type initially remains a "potential" flow. Thus we could have minimized the functional given in equation (102) in order to obtain the correct solution. However, in this case the boundary conditions are of a general type (but mass conserving!) so we must add a boundary term to the functional:

$$V = V_{pc} - v_1 \left( \int_V \rho d^3 x - M_0 \right) + \oint_B v \rho_0 \vec{v}_B \cdot d\vec{S} \quad (111)$$

$V_{pc}$ is defined in equation (103). This functional must be minimized numerically with respect to $\vec{v}, v_1, \rho$ in order to obtain the final steady flow.

Consider a more realistic scheme in which a viscous boundary layer develops around an immersed body. In this boundary layer vorticity can be generated (in contrast to non viscous flows in which vorticity can not be generated). The normal velocity component at the interface between the region of interest and the boundary layer need not be zero and further more $\alpha_B$ on this interface need not be zero. The quantities $\alpha_B, \vec{v}_B$ are assumed to be known from measurement or some other method of calculation or model. In this case in order to obtain the final steady flow we may minimize the functional given in equation (73) with respect to $\hat{\alpha}, \hat{\beta}, \hat{v}, \rho$. The initial values of $\hat{\alpha}, \hat{\beta}$ is of course:

$$\hat{\alpha} = 0, \hat{\beta} = 0. \quad (112)$$

The Variational Technique for Time Dependent Flows

After obtaining the steady state flow it may be interesting to track the time development of the configuration. That can be done using the Euler equations of motion. However, using the full action principle provides a second alternative. The extremum configuration of the action A which is a set of functions $\alpha, \beta, v, \rho$ each defined over the four dimensional space-time, describes the time evolution of the system under the assumption of small viscosity. As in the case of general boundary conditions the initial conditions must be inserted "by hand" and thus we obtain the new action principle for a compressible flow:

$$A_{tgc} \equiv \int_{t_0}^{t_1} L_{gc} dt - \int (\alpha(x^k, t_0)\beta(x^k, t_0) + v(x^k, t_0))\rho(x^k, t_0) d^3 x + \quad (113)$$

$$\int (\alpha(x^k, t_1)\beta(x^k, t_1) + v(x^k, t_1))\rho(x^k, t_1) d^3 x,$$

in which $L_{gc}$ is given in equation (39). The time $t_0$ refers to the initial time of the system in which it is described by: $\alpha(x^k, t_0), \beta(x^k, t_0), v(x^k, t_0), \rho(x^k, t_0)$. The time $t_1$ refers to the final time in which the system has achieved a steady stable configuration. At that time the configuration is given by: $\alpha(x^k, t_1), \beta(x^k, t_1), v(x^k, t_1), \rho(x^k, t_1)$. In the expression for $A_{tgc}$ only $\beta(x^k, t_0), v(x^k, t_0)$ and $\beta(x^k, t_1), v(x^k, t_1)$ should be regarded as variational variables. The functions $\alpha(x^k, t_0), \rho(x^k, t_0)$ and $\alpha(x^k, t_1), \rho(x^k, t_1)$ should be regarded as given functions.

For an incompressible flow the action principle can be given similarly by:

$$A_{tgi} \equiv \int_{t_0}^{t_1} L_{gi} dt - \int (\alpha(x^k, t_0)\beta(x^k, t_0) + v(x^k, t_0))\rho_0 d^3 x + \quad (114)$$

$$\int (\alpha(x^k, t_1)\beta(x^k, t_1) + v(x^k, t_1))\rho_0 d^3 x,$$

in which $L_{gi}$ is given in equation (40). In the reduced case:

$$A_{tgir} \equiv \int_{t_0}^{t_1} L_{gir} dt - \int (\alpha(x^k, t_0)\beta(x^k, t_0) + \nu(x^k, t_0))\rho_0 d^3 x + \qquad (115)$$
$$\int (\alpha(x^k, t_1)\beta(x^k, t_1) + \nu(x^k, t_1))\rho_0 d^3 x,$$

in which $L_{gir}$ is given in equation (41).

The search for the extremum of the action must start from some given space-time configuration which we can not denote as "initial". This configuration is given by:

$$\alpha(x^k, t) = \alpha(x^k, t_0) + \frac{\alpha(x^k, t_1) - \alpha(x^k, t_0)}{t_1 - t_0} t \qquad (116)$$

$$\beta(x^k, t) = \beta(x^k, t_0) + \frac{\beta(x^k, t_1) - \beta(x^k, t_0)}{t_1 - t_0} t$$

$$\nu(x^k, t) = \nu(x^k, t_0) + \frac{\nu(x^k, t_1) - \nu(x^k, t_0)}{t_1 - t_0} t.$$

For a compressible flow we must add:

$$\rho(x^k, t) = \rho(x^k, t_0) + \frac{\rho(x^k, t_1) - \rho(x^k, t_0)}{t_1 - t_0} t. \qquad (117)$$

While for an incompressible flow we must add:

$$h(x^k, t) = h(x^k, t_0) + \frac{h(x^k, t_1) - h(x^k, t_0)}{t_1 - t_0} t. \qquad (118)$$

Description of a Simple Numerical Implementation of the Method

I present here a simple embodiment of the method based on a 2-D finite difference cartesian scheme.

Time Independent Flows

Figure 6:
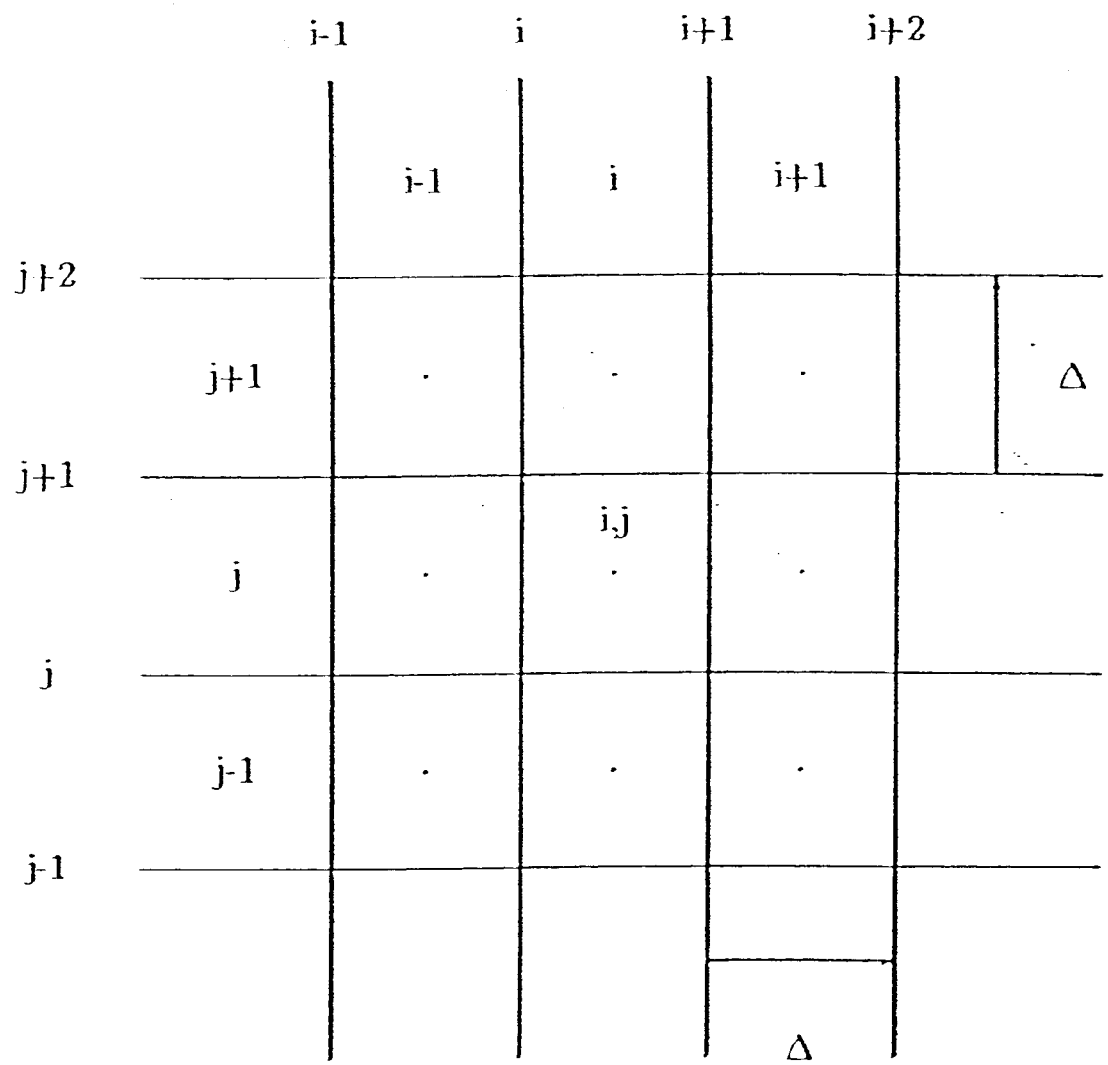
FIGS. 6–8 are illustrations useful in explaining the theory of the present invention.
Figure 7:
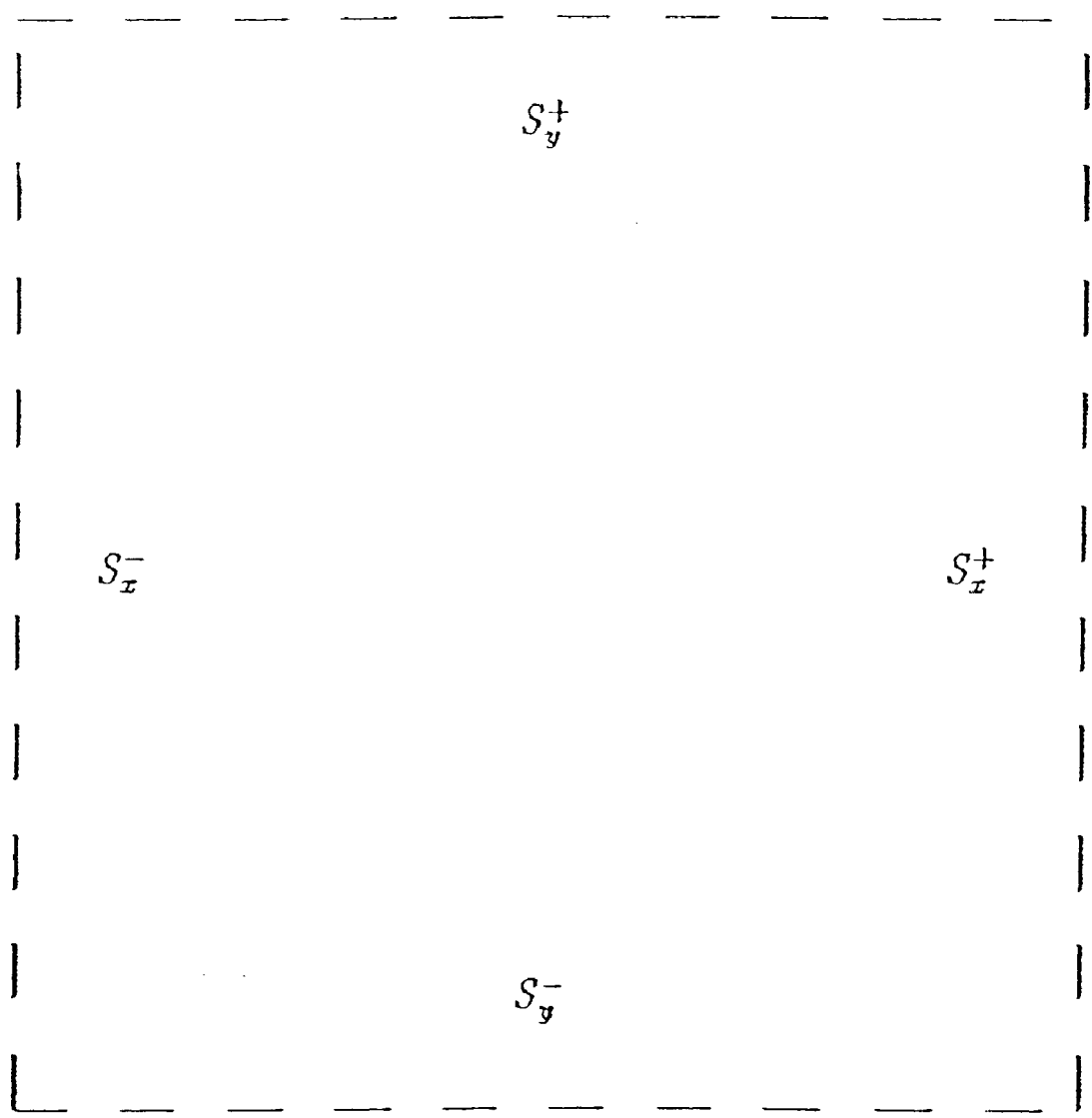

In the following section we will give a discrete two dimensional representation of the different potential functionals which must be minimized in order to obtain a stable steady flows in various conditions. The embodiment is described with respect to grid given in FIG. 6. The grid is made of two sub grids of equal spacing $\Delta$. One of the grids is depicted by crossed lines while the other by dots. Each grid location is designated by an (i,j) pair (see FIG. 6.) in which for the dotted grid i=1 . . . Nx, i=1 . . . Ny while for the crossed grid i=1 . . . Nx+1, j=1 . . . Ny+1. Thus Lx=Nx$\Delta$, Ly=Ny$\Delta$ in which Lx and Ly are the lengths of the grid in the X and Y directions respectively. The fields $\beta,\nu$ are sampled on the crossed grid, while the fields $\alpha,\rho,\Phi,h$ are sampled on the dotted grid. The potential term $V_c$ defined in equation (56) can be given as a sum of two dimensional integrals over all the dotted grid locations:

$$V_c = \sum_{i,j} V_{c:i,j} \qquad (119)$$

$$V_{c:i,j} \equiv \int_{V_{i,j}} \left[\frac{1}{2}(\hat{\alpha}\vec{\nabla}\hat{\beta} + \vec{\nabla}\hat{\nu})^2 + \varepsilon(\rho) + \Phi\right]\rho d^2 x.$$

The quantity $V_{c:i,j}$ can be approximated in the following way:

$$V_{c:i,j} = \Delta^2(\overline{V}_{c:i,j} + O(\Delta^2)). \qquad (120)$$

In which:

$$\overline{V}_{c:i,j} \equiv \left[\frac{1}{2}\left(\hat{\alpha}_{i,j}(\overline{\vec{\nabla}}\hat{\beta})_{i,j} + (\overline{\vec{\nabla}}\hat{\nu})_{i,j}\right)^2 + \varepsilon(\rho_{i,j}) + \Phi_{i,j}\right]\rho_{i,j}. \qquad (121)$$

The quantities $(\overline{\vec{\nabla}}f)_{i,j}$ for any function sampled on the crossed grid are defined by:

$$(\overline{\vec{\nabla}}f)_{i,j} \equiv \left(\frac{\overline{\partial f}}{\partial x}, \frac{\overline{\partial f}}{\partial y}\right)_{i,j} \qquad (122)$$

$$\frac{\overline{\partial f}}{\partial x} \equiv \frac{1}{2\Delta}(f_{i+1,j+1} + f_{i+1,j} - f_{i,j+1} - f_{i,j})$$

$$\frac{\overline{\partial f}}{\partial y} \equiv \frac{1}{2\Delta}(f_{i+1,j+1} + f_{i,j+1} - f_{i+1,j} - f_{i,j}).$$

For a small enough $\Delta$ we can write:

$$V_c \simeq \Delta^2 \sum_{i,j} \overline{V}_{c:i,j} \qquad (123)$$

Thus in the above approximation $V_c$ becomes a function of $N=(2NxNy+2(Nx+1)(Ny+1))$ variables. In order to have a complete discrete expression for $V_{tc}$ given in equation (62) which is the functional of interest, we must evaluate the Mass M given in equation (57) this can be done along the same lines as before, that is:

$$M \simeq \Delta^2 \sum_{i,j} \rho_{i,j}. \qquad (124)$$

Similarly we evaluate the integral J defined in equation (58):

$$J \simeq \Delta^2 \sum_{i,j} \hat{\alpha}_{i,j}\rho_{i,j}. \qquad (125)$$

Thus in terms of $V_c,M,J$, the functional $V_{tc}$ is approximated by a discrete function of N+2 variables which is written below again for completeness:

$$V_{tc}=V_c-\beta_1(J-\overline{\alpha}M_0)-\nu_1(M-M_0). \qquad (126)$$

$V_{tc}$ can be minimized using standard numerical techniques such as the conjugate gradient method given in "Numerical Recipes in C" by W. H. Press, B. P. Flannery S. A. Teukolsky and W. T. Vetterling (Cambridge University Press (1990)). Minimization of the function $V_{tc}$ is the core of this method. For the incompressible case we have:

$$V_i \simeq \Delta^2 \sum_{i,j} \overline{V}_{i:i,j} \qquad (127)$$

$$\overline{V}_{i:i,j} \equiv \left[\frac{1}{2}\left(\hat{\alpha}_{i,j}(\overline{\vec{\nabla}}\hat{\beta})_{i,j} + (\overline{\vec{\nabla}}\hat{\nu})_{i,j}\right)^2 + \Phi_{i,j}\right]\rho_{i,j} + h_{i,j}(\rho_{i,j} - \rho_0).$$

In terms of $V_i,M,J$ the functional $V_{ti}$ is approximated by a discrete function of N+2 variables which is written below again for completeness:

$$V_{ti}=V_i-\beta_1(J-\overline{\alpha}M_0)-\nu_1(M-M_0). \qquad (128)$$

Time Independent Flows with General Boundary Conditions

In the case of general boundary conditions we need to estimate the contribution of the boundary integral $V_B$ given in equation (74). The boundary of Our grid are depicted in FIG. (7) and is dissected into four linear parts $S_y^-, S_x^-, S_y^+, S_x^-$. The contribution of each boundary part to $V_B$ is estimated below:

$$V_B \simeq \frac{1}{2}\Delta\Bigg\{\sum_i v_{y:i}(S_y^-)\rho_i(S_y^-) \qquad (129)$$
$$[\alpha_i(S_y^-)(\hat{\beta}_{i,1} + \hat{\beta}_{i+1,1}) + (\hat{v}_{i,j} + \hat{v}_{i+1,1})] -$$
$$\sum_j v_{x:j}(S_x^+)\rho_j(S_x^+)$$
$$[\alpha_j(S_x^+)(\hat{\beta}_{Nx+1,j} + \hat{\beta}_{Nx+1,j+1}) + (\hat{v}_{Nx+1,j} + \hat{v}_{Nx+1,j+1})] -$$
$$\sum_i v_{y:i}(S_y^+)\rho_i(S_y^+)$$
$$[\alpha_i(S_y^+)(\hat{\beta}_{i,Ny+1} + \hat{\beta}_{i+1,Ny+1}) + (\hat{v}_{i,Ny+1} + \hat{v}_{i+1,Ny+1})] +$$
$$\sum_j v_{x:j}(S_x^-)\rho_j(S_x^-)[\alpha_j(S_x^-)(\hat{\beta}_{1,j} + \hat{\beta}_{1,j+1}) + (\hat{v}_{1,j} + \hat{v}_{1,j+1})]\Bigg\}.$$

The boundary conditions in terms of: $v_{y:i}(S_y^-)$, $\rho_i(S_y^-)$, $\alpha_i(S_y^-)$, $v_{x:j}(S_x^+)$, $\rho_j(S_x^+)$, $\alpha_j(S_x^+)$, $v_{y:i}(S_y^+)$, $\rho_i(S_y^+)$, $\alpha_i(S_y^+)$, $v_{x:j}(S_x^-)$, $\rho_j(S_x^-)$, $\alpha_j(S_x^-)$ must be given in advance. The total potential $V_{tgc}$ for a compressible flow with general boundary conditions is given in equation (73), a discrete approximation can be achieved following the lines of the previous section:

$$V_{tgc} \simeq \Delta^2 \sum_{i,j}\overline{V}_{tgc:i,j} + V_B \qquad (130)$$

$$\overline{V}_{tgc:i,j} \equiv \left[-\hat{\alpha}_{i,j} + \frac{1}{2}\left(\hat{\alpha}_{i,j}(\overline{\nabla}\hat{\beta})_{i,j} + (\overline{\nabla}\hat{v})_{i,j}\right)^2 + \varepsilon(\rho_{i,j}) + \Phi_{i,j}\right]\rho_{i,j}.$$

Similarly, for an incompressible flow the total potential $V_{tgi}$ given in equation (75) can be approximated by:

$$V_{tgi} \simeq \Delta^2 \sum_{i,j}\overline{V}_{tgi:i,j} + V_B \qquad (131)$$

$$\overline{V}_{tgi:i,j} \equiv \left[-\hat{\alpha}_{i,j} + \frac{1}{2}\left(\hat{\alpha}_{i,j}(\overline{\nabla}\hat{\beta})_{i,j} + (\overline{\nabla}\hat{v})_{i,j}\right)^2 + \Phi_{i,j}\right]\rho_{i,j} +$$
$$h_{i,j}(\rho_{i,j} - \rho_0)$$

Initial Configuration in terms of Clebsch Variables

Since the initial configuration is given by the natural variables $\vec{v},\rho$, we must deduce the values of $\alpha, \beta, v^1$ of this initial configuration. The velocity field $\vec{v}$ can be sampled on the dotted grid coordinates. Using equation (79) we arrive easily at a formula for $\alpha$:

$$\hat{\alpha}_{i,j} = \frac{1}{2}\vec{v}_{i,j}^2 + h_{i,j} + \Phi_{i,j}. \qquad (132)$$

[1] At the time t=0 we have according to equation (42) $\alpha=\hat{\alpha}$, $\beta=\hat{\beta}$, $v=\hat{v}$.

Solving for $\beta$, we need to sample $\vec{A}$ given in equation (85) on the dotted grid:

$$\vec{A}_{i,j} = \frac{\vec{v}_{i,j}}{v_{i,j}^2}. \qquad (133)$$

Assuming that in our case condition (83) is fulfilled, the $\beta$ on the crossed grid can than be calculated using a discrete form of equation (84):

$$\hat{\beta}_{1,1}=0$$
$$\hat{\beta}_{1,j}=\hat{\beta}_{1,j-1}+\Delta A_{y:1,j-1}$$
$$\hat{\beta}_{i,j}=\hat{\beta}_{i-1,j}+\Delta A_{x:i-1,j}. \qquad (134)$$

In the case that conditions (83) is not satisfied one should continue along the iterative process defined in equation (93). Once $\hat{\alpha}_{i,j},\hat{\beta}_{i,j}$ are calculated it remains to calculate $\hat{v}_{i,j}$. This can be done using a discrete form of equation (96):

$$\hat{v}_{1,1}=0$$
$$\hat{v}_{1,j}=\hat{v}_{1,j-1}+\Delta(v_{y:1,j-1}-\hat{\alpha}_{1,j-1}\overline{\nabla}_y\hat{\beta}_{1,j-1})$$
$$\hat{v}_{i,j}=\hat{v}_{i-1,j}+\Delta(v_{x:i-1,j}-\hat{\alpha}_{i-1,j}\overline{\nabla}_x\hat{\beta}_{i-1,j}). \qquad (135)$$

Time Dependent Flows

Figure 8:
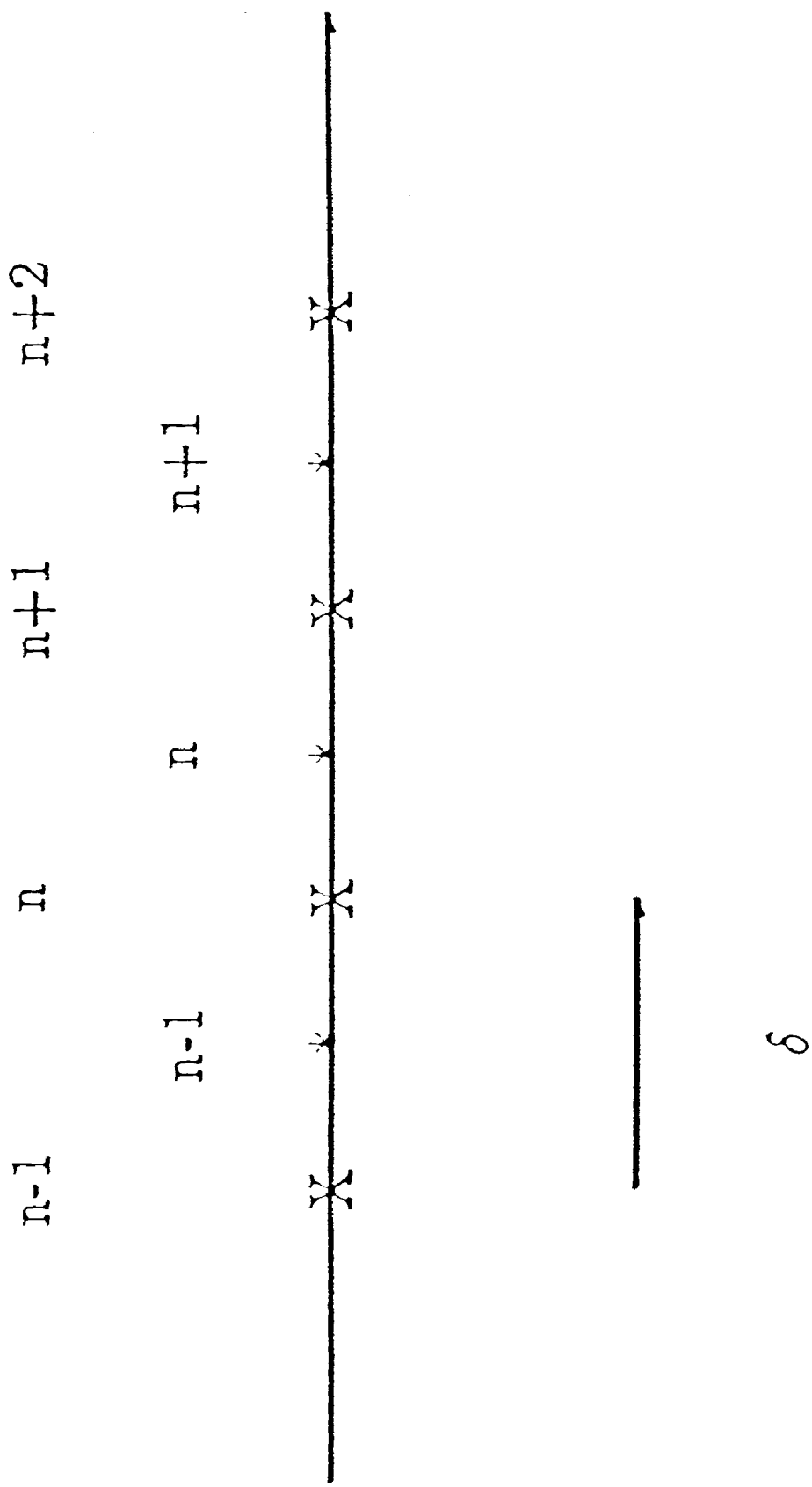

To describe time dependent flows we need to add a new dimension to the sampling grid. The time axis is sampled using a one dimensional grid made of two sub grids of equal spacing $\delta$. One of the grids is depicted by crosses while the other by dots. Each grid location is designated by a number n (see FIG. 8) in which for the dotted grid n=1 . . . . $N_t$ while for the crossed grid n=1 . . . $N_t+1$. Thus $L_t=N_t\delta$ is the time duration described by the grid which should exceed the time it takes for the flow to reach from the initial configuration to the final steady flow. As in the spatial grid, the fields $\beta,v$ are sampled on the crossed grid, while the fields $\alpha,\rho,\Phi,h$ are sampled on the dotted grid. The Lagrangian L is also sampled on the dotted grid.

The action functional which is suitable to describe the evolution of the flow is $A_{tgc}$ given in equation (113). The action $A_{tgc}$ can be approximated by:

$$A_{tgc} \simeq \qquad (136)$$
$$\delta\sum_{n=1}^{N_t} L_{gc}^n + \Delta^2\sum_{i,j}[-(\alpha_{i,j}^0\,\overline{B}_{i,j}^1 + \overline{v}_{i,j}^1)\rho_{i,j}^0 + (\alpha_{i,j}^j\,\overline{B}_{i,j}^{N_t+1} + \overline{v}_{i,j}^{N_t+1})\rho_{i,j}^f],$$

in which:

$$\overline{f}_{i,j} \equiv \frac{1}{4}(f_{i+1,j+1} + f_{i,j+1} + f_{i+1,j} + f_{i,j}). \qquad (137)$$

The numbers $\alpha_{i,j}^0, \rho_{i,j}^0$ are given by the initial configuration of the flow. The numbers $\alpha_{i,j}^f, \rho_{i,j}^f$ are given by the final steady flow. The Lagrangian $L_{gc}^n$ given in equation (39), can be dissected using equation (47):

$$L_{gc}^n = T^n - U_c^n, \qquad (138)$$

T is given by equation (48), $U_c$ is given by equation (49). The kinetic term $T^n$ can be approximated by:

$$T^n \simeq \Delta^2\sum_{i,j}[(\alpha_{i,j}^n(\overline{\partial}_t\,\overline{B}_{i,j})^n + (\overline{\partial}_t\,\overline{v}_{i,j})^n)\rho_{i,j}^n], \qquad (139)$$

in which:

$$(\overline{\partial}_t\,f)^n \equiv \frac{f^{n+1} - f^n}{\delta}. \qquad (140)$$

The term $U_c^n$ can be approximated taking a cue from equation (121) and equation (129) such that:

$$U_c^n = V_c^n + V_B^n. \qquad (141)$$

In which:

$$V_c^n \simeq \Delta^2 \sum_{i,j} \left[ \frac{1}{2}\left(\alpha_{i,j}^n \left(\bar{\bar{\nabla}}\beta\right)_{i,j}^n + \left(\bar{\bar{\nabla}}v\right)_{i,j}^n\right)^2 + \varepsilon(\rho_{i,j}^n) + \Phi_{i,j}\right]\rho_{i,j}^n \qquad (142)$$

And: $V_B^n \simeq$ (143)

$$\frac{1}{2}\Delta\left\{\sum_i v_{y;i}(S_y^-)\rho_i(S_y^-)[\alpha_i(S_y^-)(\tilde{\beta}_{1,1}^n + \tilde{\beta}_{i+1,1}^n) + (\tilde{v}_{i,1}^n + \tilde{v}_{i+1,1}^n)] - \right.$$

$$\sum_j v_{x;j}(S_x^+)\rho_j(S_x^+)[$$

$$\alpha_j(S_x^+)(\tilde{\beta}_{Nx+1,j}^n + \tilde{\beta}_{Nx+1,j+1}^n) + (\tilde{v}_{Nx+1,j}^n + \tilde{v}_{Nx+1,j+1}^n)] -$$

$$\sum_i v_{y;i}(S_y^+)\rho_i(S_y^+)[\alpha_i(S_y^+)(\tilde{\beta}_{i,Ny+1}^n + \tilde{\beta}_{i+1,Ny+1}^n) +$$

$$(\tilde{v}_{i,Ny+1}^n + \tilde{v}_{i+1,Nx+1}^n)] + \sum_j v_{x;j}(S_x^-)\rho_j$$

$$\left.(S_x^-)[\alpha_j(S_x^-)(\tilde{\beta}_{1,j}^n + \tilde{\beta}_{1,j+1}^n) + (\tilde{v}_{1,j}^n + \tilde{v}_{1,j+1}^n)]\right\}.$$

In the above expressions the following definitions were used:

$$\bar{\bar{\nabla}} f_{i,j}^n \equiv \frac{1}{2}\left(\bar{\nabla} f_{i,j}^n + \bar{\nabla} f_{i,j}^{n+1}\right), \text{ and:} \qquad (144)$$

$$\tilde{f}^n \equiv \frac{1}{2}(f^{n+1} + f^n). \qquad (145)$$

For the incompressible case the action functional which is suitable to describe the evolution of the flow is $A_{tgi}$ given in equation (114). The action $A_{tgi}$ can be approximated by:

$$A_{tgi} \simeq \delta \sum_{n=1}^{N_t} L_{gi}^n + \Delta^2 \sum_{i,j} \left[-(\alpha_{i,j}^0 \tilde{\beta}_{i,j}^1 + \tilde{v}_{i,j}^1)\rho_0 + (\alpha_{i,j}^f \tilde{\beta}_{i,j}^{N_t+1} + \tilde{v}_{i,j}^{N_t+1})\rho_0\right], \qquad (146)$$

The Lagrangian $L_{gi}^n$ given in equation (40), can be dissected using equation (47):

$$L_{gi}^n = T^n - U_i^n, \qquad (147)$$

The functional $T^n$ is approximated in equation (139), the functional $U_i^n$ can be written as:

$$U_i^n = V_i^n + V_B^n. \qquad (148)$$

The term $V_B^n$ is approximated in equation (143), the term $V_i^n$ can be approximated taking a cue from equation (127):

$$V_i^n \simeq \qquad (149)$$

$$\Delta^2 \sum_{i,j} \left[\left[\frac{1}{2}\left(\alpha_{i,j}^n\left(\bar{\bar{\nabla}}\beta\right)_{i,j}^n + \left(\bar{\bar{\nabla}}v\right)_{i,j}^n\right)^2 + \Phi_{i,j}\right]\rho_{i,j}^n + h_{i,j}^n(\rho_{i,j}^n - \rho_0)\right].$$

It remains to fix the starting point of the minimization process. This can be done using a discrete form of: equation (116), equation (117) and equation (118):

$$\alpha_{i,j}^n = \alpha_{i,j}^0 + \frac{\alpha_{i,j}^f - \alpha_{i,j}^0}{L_t}\left(n - \frac{1}{2}\right) \qquad (150)$$

$$\beta_{i,j}^n = \beta_{i,j}^1 + \frac{\beta_{i,j}^{N_t+1} - \beta_{i,j}^1}{L_t}(n-1)$$

$$v_{i,j}^n = v_{i,j}^1 + \frac{v_{i,j}^{N_t+1} - v_{i,j}^1}{L_t}(n-1).$$

For a compressible flow we must add:

$$\rho_{i,j}^n = \rho_{i,j}^0 + \frac{\rho_{i,j}^f - \rho_{i,j}^0}{L_t}\left(n - \frac{1}{2}\right). \qquad (151)$$

While for an incompressible flow we must add:

$$h_{i,j}^n = h_{i,j}^0 + \frac{h_{i,j}^f - h_{i,j}^0}{L_t}\left(n - \frac{1}{2}\right). \qquad (152)$$

The numbers: $\alpha_{i,j}^0$, $\beta_{i,j}^1$, $v_{i,j}^1$, $\rho_{i,j}^0$ and $h_{i,j}^0$ describe the initial configuration of the flow. The numbers: $\alpha_{i,j}^f$, $\beta_{i,j}^{N_t+1}$, $v_{i,j}^{N_t+1}$, $\rho_{i,j}^f$ and $h_{i,j}^f$ describe the final steady configuration of the flow. It should be noted that $\beta$ and $v$ are defined on the crossed grid for the values n=1 and n=$N_t$+1 and serve as variational variables at those points. While $\alpha$, $\rho$ and h are defined out of their dotted grid at the initial and final times and do not serve as variational variables at those times, but rather as given numbers.

What is claimed is:

1. A method of providing information useful in designing a solid body past which a compressible fluid flows, comprising the steps of:
   (a) providing an equation of state for the fluid;
   (b) formulating the fluid flow in terms of a potential functional $$\int_t \left[\frac{1}{2}(\alpha\vec{\nabla}\beta + \vec{\nabla}v)^2 + \varepsilon(\rho) + \Phi\right]\rho d^3 x -$$

$$\beta_1\left(\int_v \alpha\rho d^3 x - \vec{\alpha} M_0\right) - v_1\left(\int_v \rho d^3 x - M_0\right)$$

wherein $\alpha$, $\beta$ and $v$ are Clebsch scalar fields, $\rho$ is a density field, $\beta_1$ and $v_1$ are scalar variables, $\epsilon$ is a specific internal energy that is related to $\rho$ via said equation of state, $\Phi$ is a potential of an external force, $\bar{\alpha}$ and $M_0$ are constants and V is a volume of integration exclusive of the body;
   (c) forming a numerical representation of said potential functional external to the body;
   (d) extremizing said numerical representation of said potential functional with respect to $\alpha$, $\beta$, $v$, $\rho$, $\beta_1$ and $v_1$; and
   (e) computing a velocity vector field as $\alpha\vec{\nabla}\beta + \vec{\nabla}v$, said velocity vector field being the information useful in designing the solid body.

2. The method of claim 1, wherein said numerical representation includes numerical values of $\alpha$, $\beta$, $v$ and $\rho$ at a plurality of points of at least one grid.

3. The method of claim 2, wherein said numerical representation further includes numerical values of $\beta_1$ and $v_1$.

4. A system for providing information useful in designing a solid body past which a compressible fluid flows, comprising:
   (a) a software module including a plurality of instructions for computing, from numerical representations of three Clebsch scalar fields α, β and ν and a density field ρ outside the body, a corresponding numerical representation of a potential functional $$\int_V \left[\frac{1}{2}(\alpha\vec{\nabla}\beta + \vec{\nabla}\nu)^2 + \varepsilon(\rho) + \Phi\right]\rho d^3x -$$
$$\beta_1\left(\int_V \alpha\rho d^3x - \overline{\alpha}M_o\right) - \nu_1\left(\int_V \rho d^3x - M_o\right)$$

wherein $\beta_1$ and $\nu_1$ are scalar variables, $\varepsilon$ is a specific internal energy that is related to ρ via an equation of state of the fluid, Φ is a potential of an external force, $\overline{\alpha}$ and $M_0$ are constants and V is a volume of integration exclusive of the body, for varying $\beta_1$, $\nu_1$ and said numerical representations of α, β, ν and ρ to extremize said numerical representation of said potential functional, and for computing a velocity vector field as $\alpha\vec{\nabla}\beta + \vec{\nabla}\nu$, said velocity vector field being the information useful in designing the solid body;

(b) a processor for executing said instructions; and (c) a memory for storing said numerical representations.

5. The method of claim 4, wherein said numerical representations of said fields α, β, ν and ρ include numerical values of said fields at a plurality of points of at least one grid.

6. A method of providing information useful in designing a solid body past which a compressible fluid flows, comprising the steps of:

(a) providing an equation of state for the fluid;

(b) formulating the fluid flow in terms of an action which is the sum of:

(i) an action integral, from an initial time $t_0$ to a final time $t_1$, of a Lagrangian functional $$L = \int_V \left[-\left(\alpha\frac{\partial\beta}{\partial t} + \frac{\partial\nu}{\partial t}\right) - \frac{1}{2}(\alpha\vec{\nabla}\beta + \vec{\nabla}\nu)^2 - \varepsilon(\rho) - \Phi\right]\rho d^3x$$

wherein α, β and ν are Clebsch scalar fields, ρ is a density field, $\varepsilon$ is a specific internal energy that is related to ρ via said equation of state, Φ is a potential of an external force and V is a volume of integration exclusive of the body, (ii) a spatial integral $$\int_V (\alpha\beta + \nu)\rho d^3x$$

wherein α, β, ν and ρ are evaluated at said final time $t_1$, and (iii) a negative of said spatial integral wherein α, β, ν and ρ are evaluated at said initial time $t_0$;

(c) forming a numerical representation of said action external to the body;

(d) extremizing said numerical representation of said action with respect to α, β, ν and ρ; and (e) computing a velocity vector field as $\alpha\vec{\nabla}\beta + \vec{\nabla}\nu$, said velocity vector field being the information useful in designing the solid body.

7. The method of claim 6, wherein said numerical representation includes numerical values of α, β, ν and ρ at a plurality of points of at least one grid.

8. A method of providing information useful in designing a solid body past which an incompressible fluid having a density $\rho_0$ flows, comprising the steps of:

(a) formulating the fluid flow in terms of a potential functional $$\int_V \left[\frac{1}{2}(\alpha\vec{\nabla}\beta + \vec{\nabla}\nu)^2 + \Phi\right]\rho_0 d^3x - \beta_1\left(\int_V \alpha\rho_0 d^3x - \overline{\alpha}M_0\right)$$

wherein α, β and ν are Clebsch scalar fields, $\beta_1$ is a scalar variable, Φ is a potential of an external force, $\overline{\alpha}$ and $M_0$ are constants and V is a volume of integration exclusive of the body;

(b) forming a numerical representation of said potential functional external to the body;

(c) extremizing said numerical representation of said potential functional with respect to α, β, ν and $\beta_1$; and (d) computing a velocity vector field as $\alpha\vec{\nabla}\beta + \vec{\nabla}\nu$, said velocity vector field being the information useful in designing the solid body.

9. A method of providing information useful in designing a solid body past which a compressible fluid flows, comprising the steps of:

(a) providing an equation of state for the fluid;

(b) formulating the fluid flow in terms of a potential functional $$\int_V \left[\frac{1}{2}(\vec{\nabla}\nu)^2 + \varepsilon(\rho) + \Phi\right]\rho d^3x - \nu_l\left(\int_V \rho d^3x - M_0\right);$$

wherein ν is a Clebsch scalar field, ρ is a density field, $\varepsilon$ is a specific internal energy that is related to ρ via said equation of state, Φ is a potential of an external force, $M_0$ is a constant and V is a volume of integration exclusive of the body;

(c) forming a numerical representation of said potential functional external to the body;

(d) extremizing said numerical representation of said potential functional with respect to ν and ρ; and (e) computing a velocity vector field as $\vec{\nabla}\nu$, said velocity vector field being the information useful in designing the solid body.

10. A system for providing information useful in designing a solid body past which an incompressible fluid having a density $\rho_0$ flows, comprising:

(a) a software module including a plurality of instructions for computing, from numerical representations of three Clebsch scalar fields α, β and ν outside the body, a corresponding numerical representation of a potential functional $$\int_V \left[\frac{1}{2}(\alpha\vec{\nabla}\beta + \vec{\nabla}\nu)^2 + \Phi\right]\rho_0 d^3x - \beta_1\left(\int_V \alpha\rho_0 d^3x - \overline{\alpha}M_0\right)$$

wherein $\beta_1$ is a scalar variable, Φ is a potential of an external force, $\overline{\alpha}$ and $M_0$ are constants and V is a volume of integration exclusive of the body, for varying $\beta_1$ and said numerical representations of α, β and ν to extremize said numerical representation of said potential functional, and for computing a velocity vector field as $\alpha\vec{\nabla}\beta + \vec{\nabla}\nu$, said velocity vector field being the information useful in designing the solid body;

(b) a processor for executing said instructions; and (c) a memory for storing said numerical representations.

11. A system for providing information useful in designing a solid body past which a compressible fluid flows, comprising:

(a) a software module including a plurality of instructions for computing, from numerical representations of a Clebsch scalar field $\nu$ and a density field $\rho$ outside the body, a corresponding numerical representation of a potential functional $$\int_V \left[\frac{1}{2}(\vec{\nabla}\nu)^2 + \varepsilon(\rho) + \Phi\right]\rho d^3x - \nu_l\left(\int_V \rho d^3x - M_0\right);$$

wherein $\varepsilon$ is a specific internal energy that is related to $\rho$ via an equation of state of the fluid, $\Phi$ is a potential of an external force, $M_0$ is a constant and V is a volume of integration exclusive of the body, for varying said numerical representations of $\nu$ and $\rho$ to extremize said numerical representation of said potential functional, and for computing a velocity vector field as $\vec{\nabla}\nu$, said velocity vector field being the information useful in designing the solid body;

(b) a processor for executing said instructions; and (c) a memory for storing said numerical representations.

12. A method of providing information useful in designing a solid body past which an incompressible fluid having a density $\rho_0$ flows, comprising the steps of:

(a) formulating the fluid flow in terms of an action which is the sum of:

(i) an action integral, from an initial time $t_0$ to a final time $t_1$, of a Lagrangian functional $$\int_V \left[-\left(\alpha\frac{\partial\beta}{\partial t} + \frac{\partial\nu}{\partial t}\right) - \frac{1}{2}(\alpha\vec{\nabla}\beta + \vec{\nabla}\nu)^2 - \Phi\right]\rho_0 d^3x$$

wherein $\alpha$, $\beta$ and $\nu$ are Clebsch scalar fields, $\Phi$ is a potential of an external force and V is a volume of integration exclusive of the body, (ii) a spatial integral $$\int_V (\alpha\beta + \nu)\rho_0 d^3x$$

wherein $\alpha$, $\beta$ and $\nu$ are evaluated at said final time $t_1$, and (iii) a negative of said spatial integral wherein $\alpha$, $\beta$ and $\nu$ are evaluated at said initial time $t_0$;

(b) forming a numerical representation of said action external to the body;

(c) extremizing said numerical representation of said action with respect to $\alpha$, $\beta$ and $\nu$; and (d) computing a velocity vector field as $\alpha\vec{\nabla}\beta + \vec{\nabla}\nu$, said velocity vector field being the information useful in designing the solid body.

13. A system for providing information useful in designing a solid body past which a compressible fluid flows, comprising:

(a) a software module including a plurality of instructions for computing, from numerical representations of three Clebsch scalar fields $\alpha$, $\beta$ and $\nu$ and a density field $\rho$ outside the body, a corresponding numerical representation of an action that is a sum of:

(i) an action integral, from an initial time $t_0$ to a final time $t_1$, of a Lagrangian functional $$L = \int_V \left[-\left(\alpha\frac{\partial\beta}{\partial t} + \frac{\partial\nu}{\partial t}\right) - \frac{1}{2}(\alpha\vec{\nabla}\beta + \vec{\nabla}\nu)^2 - \varepsilon(\rho) - \Phi\right]\rho d^3x,$$

wherein $\varepsilon$ is a specific internal energy that is related to $\rho$ via an equation of state of the fluid, $\Phi$ is a potential of an external force and V is a volume of integration exclusive of the body, (ii) a spatial integral $$\int_V (\alpha\beta + \nu)\rho d^3x$$

wherein $\alpha$, $\beta$, $\nu$ and $\rho$ are evaluated at said final time $t_1$, and (iii) a negative of said spatial integral wherein $\alpha$, $\beta$, $\nu$ and $\rho$ are evaluated at said initial time $t_0$; for varying said numerical representations of $\alpha$, $\beta$, $\nu$ and $\rho$ to extremize said numerical representation of said potential functional, and for computing a velocity vector field as $\alpha\vec{\nabla}\beta + \vec{\nabla}\nu$, said velocity vector field being the information useful in designing the solid body;

(b) a processor for executing said instructions; and (c) a memory for storing said numerical representations.

14. The method of claim 13, wherein said numerical representations of said $\alpha$, $\beta$, $\nu$ and $\rho$ includes numerical values of said fields at a plurality of points of at least one grid.

15. A system for providing information useful in designing a solid body past which an incompressible fluid having a density $\rho_0$ flows, comprising:

(a) a software module including a plurality of instructions for computing, from numerical representations of three Clebsch scalar fields $\alpha$, $\beta$ and $\nu$ outside the body, a corresponding numerical representation of an action that is a sum of:

(i) an action integral, from an initial time $t_0$ to a final time $t_1$, of a Lagrangian functional $$\int_V \left[-\left(\alpha\frac{\partial\beta}{\partial t} + \frac{\partial\nu}{\partial t}\right) - \frac{1}{2}(\alpha\vec{\nabla}\beta + \vec{\nabla}\nu)^2 - \Phi\right]\rho_0 d^3x,$$

wherein $\Phi$ is a potential of an external force and V is a volume of integration exclusive of the body, (ii) a spatial integral $$\int_V (\alpha\beta + \nu)\rho_0 d^3x$$

wherein $\alpha$, $\beta$ and $\nu$ are evaluated at said final time $t_1$, and (iii) a negative of said spatial integral wherein $\alpha$, $\beta$ and $\nu$ are evaluated at said initial time $t_0$; for varying said numerical representations of $\alpha$, $\beta$ and $\nu$ to extremize said numerical representation of said potential functional, and for computing a velocity vector field as $\alpha\vec{\nabla}\beta + \vec{\nabla}\nu$, said velocity vector field being the information useful in designing the solid body;

(b) a processor for executing said instructions; and (c) a memory for storing said numerical representations.

16. A method of providing information useful in designing an aircraft past which air flows as the aircraft travels through the air, comprising the steps of:

(a) providing an equation of state for the air;
(b) formulating the air flow in terms of a potential functional $$\int_v \left[\frac{1}{2}(\alpha\vec{\nabla}\beta+\vec{\nabla}v)^2+\varepsilon(\rho)+\Phi\right]\rho d^3x - \beta_1\left(\int_v \alpha\rho d^3x - \vec{a}M_0\right) - v_1\left(\int_v \rho d^3x - M_0\right)$$

wherein $\alpha$, $\beta$ and $v$ are Clebsch scalar fields, $\rho$ is a density field, $\beta_1$ and $v_1$ are scalar variables, $\varepsilon$ is a specific internal energy that is related to $\rho$ via said equation of state, $\Phi$ is a potential of an external force, $\overline{\alpha}$ and $M_0$ are constants and V is a volume of integration exclusive of the aircraft;
(c) forming a numerical representation of said potential functional external to the aircraft;
(d) extremizing said numerical representation of said potential functional with respect to $\alpha$, $\beta$, $v$, $\rho$, $\beta_1$ and $v_1$; and
(e) computing a velocity vector field as $\alpha\vec{\nabla}\beta+\vec{\nabla}v$, said velocity vector field being the information useful in designing the solid body.

17. A system for providing information useful in designing an aircraft past which air flows as the aircraft travels through the air, comprising:
(a) a software module including a plurality of instructions for computing, from numerical representations of three Clebsch scalar fields $\alpha$, $\beta$ and $v$ and a density field $\rho$ outside the aircraft, a corresponding numerical representation of a potential functional $$\int_v \left[\frac{1}{2}(\alpha\vec{\nabla}\beta+\vec{\nabla}v)^2+\varepsilon(\rho)+\Phi\right]\rho d^3x - \beta_1\left(\int_v \alpha\rho d^3x - \vec{a}M_0\right) - v_1\left(\int_v \rho d^3x - M_0\right)$$

wherein $\beta_1$ and $v_1$ are scalar variables, $\varepsilon$ is a specific internal energy that is related to $\rho$ via an equation of state of the air, $\Phi$ is a potential of an external force, $\overline{\alpha}$ and $M_0$ are constants and V is a volume of integration exclusive of the aircraft, for varying $\beta_1$, $v_1$ and said numerical representations of $\alpha$, $\beta$, $v$ and $\rho$ to extremize said numerical representation of said potential functional, and for computing a velocity vector field as $\alpha\vec{\nabla}\beta+\vec{\nabla}v$, said velocity vector field being the information useful in designing the solid body;
(b) a processor for executing said instructions; and
(c) a memory for storing said numerical representations.

18. A method of providing information useful in designing an aircraft past which air flows as the aircraft travels through the air, comprising the steps of:
(a) providing an equation of state for the air;
(b) formulating the air flow in terms of an action which is the sum of:
(i) an action integral, from an initial time $t_0$ to a final time $t_1$, of a Lagrangian functional $$L = \int_v \left[-\left(\alpha\frac{\partial\beta}{\partial t}+\frac{\partial v}{\partial t}\right)-\frac{1}{2}(\alpha\vec{\nabla}\beta+\vec{\nabla}v)^2-\varepsilon(\rho)-\Phi\right]\rho d^3x,$$

wherein $\alpha$, $\beta$ and $v$ are Clebsch scalar fields, $\rho$ is a density field, $\varepsilon$ is a specific internal energy that is related to $\rho$ via said equation of state, $\Phi$ is a potential of an external force and V is a volume of integration exclusive of the aircraft,
(ii) a spatial integral $$\int_v (\alpha\beta+v)\rho d^3x$$

wherein $\alpha$, $\beta$, $v$ and $\rho$ are evaluated at said final time $t_1$, and
(iii) a negative of said spatial integral wherein $\alpha$, $\beta$, $v$ and $\rho$ are evaluated at said initial time $t_0$;
(c) forming a numerical representation of said action external to the aircraft;
(d) extremizing said numerical representation of said action with respect to $\alpha$, $\beta$, $v$ and $\rho$; and
(e) computing a velocity vector field as $\alpha\vec{\nabla}\beta+\vec{\nabla}v$, said velocity vector field being the information useful in designing the solid body.

19. A method of providing information useful in designing a ship past which water having a density $\rho_0$ flows as the ship travels through the water, comprising the steps of:
(a) formulating the water flow in terms of a potential functional $$\int_v \left[\frac{1}{2}(\alpha\vec{\nabla}\beta+\vec{\nabla}v)^2+\Phi\right]\rho_0 d^3x - \beta_1\left(\int_v \alpha\rho_0 d^3x - \vec{a}M_0\right)$$

wherein $\alpha$, $\beta$ and $v$ are Clebsch scalar fields, $\beta_1$ is a scalar variable, $\Phi$ is a potential of an external force, $\overline{\alpha}$ and $M_0$ are constants and V is a volume of integration exclusive of the ship;
(b) forming a numerical representation of said potential functional external to the ship;
(c) extremizing said numerical representation of said potential functional with respect to $\alpha$, $\beta$, $v$ and $\beta_1$; and
(d) computing a velocity vector field as $\alpha\vec{\nabla}\beta+\vec{\nabla}v$, said velocity vector field being the information useful in designing the solid body.

20. A method of providing information useful in designing an aircraft past which air flows as the aircraft travels through the air, comprising the steps of:
(a) providing an equation of state for the air;
(b) formulating the air flow in terms of a potential functional $$\int_v \left[\frac{1}{2}(\vec{\nabla}v)^2+\varepsilon(\rho)+\Phi\right]\rho d^3x - v_1\left(\int_v \rho d^3x - M_0\right);$$

wherein $v$ is a Clebsch scalar field, $\rho$ is a density field, $\varepsilon$ is a specific internal energy that is related to $\rho$ via said equation of state, $\Phi$ is a potential of an external force, $M_0$ is a constant and V is a volume of integration exclusive of the air;
(c) forming a numerical representation of said potential functional external to the air;
(d) extremizing said numerical representation of said potential functional with respect to $v$ and $\rho$; and
(e) computing a velocity vector field as $\vec{\nabla}v$, said velocity vector field being the information useful in designing the solid body.

21. A system for providing information useful in designing a ship past which water having a density $\rho_0$ flows as the ship travels through the water, comprising:

(a) a software module including a plurality of instructions for computing, from numerical representations of three Clebsch scalar fields α, β and ν outside the ship, a corresponding numerical representation of a potential functional $$\int_V \left[\frac{1}{2}(\alpha\vec{\nabla}\beta + \vec{\nabla}\nu)^2 + \Phi\right]\rho_0 d^3x - \beta_1\left(\int_V \alpha\rho_0 d^3x - \vec{\alpha}M_0\right)$$

wherein $\beta_1$ is a scalar variable, $\Phi$ is a potential of an external force, $\bar{\alpha}$ and $M_0$ are constants and V is a volume of integration exclusive of the ship, for varying $\beta_1$ and said numerical representations of α, β and ν to extremize said numerical representation of said potential functional, and for computing a velocity vector field as $\alpha\vec{\nabla}\beta + \vec{\nabla}\nu$, said velocity vector field being the information useful in designing the solid body;

(b) a processor for executing said instructions; and (c) a memory for storing said numerical representations.

22. A system for providing information useful in designing an aircraft past which air flows as the aircraft travels through the air, comprising:

(a) a software module including a plurality of instructions for computing, from numerical representations of a Clebsch scalar field ν and a density field ρ outside the aircraft, a corresponding numerical representation of a potential functional $$\int_V \left[\frac{1}{2}(\vec{\nabla}\nu)^2 + \varepsilon(\rho) + \Phi\right]\rho d^3x - \nu_1\left(\int_V \rho d^3x - M_0\right);$$

wherein $\epsilon$ is a specific internal energy that is related to ρ via an equation of state of the air, $\Phi$ is a potential of an external force, $M_0$ is a constant and V is a volume of integration exclusive of the aircraft, for varying said numerical representations of ν and ρ to extremize said numerical representation of said potential functional, and for computing a velocity vector field as $\vec{\nabla}\nu$, said velocity vector field being the information useful in designing the solid body;

(b) a processor for executing said instructions; and (c) a memory for storing said numerical representations.

23. A method of providing information useful in designing a ship past which water having a density $\rho_0$ flows as the ship travels through the water, comprising the steps of:

(a) formulating the water flow in terms of an action which is the sum of:

(i) an action integral, from an initial time $t_0$ to a final time $t_1$, of a Lagrangian functional $$\int_V \left[-\left(\alpha\frac{\partial\beta}{\partial t} + \frac{\partial\nu}{\partial t}\right) - \frac{1}{2}(\alpha\vec{\nabla}\beta + \vec{\nabla}\nu)^2 - \Phi\right]\rho_0 d^3x$$

wherein α, β and ν are Clebsch scalar fields, $\Phi$ is a potential of an external force and V is a volume of integration exclusive of the ship, (ii) a spatial integral $\int_V (\alpha\beta + \nu)\rho_0 d^3x$ wherein α, β and ν are evaluated at said final time $t_1$, and (iii) a negative of said spatial integral wherein α, β and ν are evaluated at said initial time $t_0$;

(b) forming a numerical representation of said action external to the ship;

(c) extremizing said numerical representation of said action with respect to α, β and ν; and (d) computing a velocity vector field as $\alpha\vec{\nabla}\beta + \vec{\nabla}\nu$, said velocity vector field being the information useful in designing the solid body.

24. A system for providing information useful in designing an aircraft past which air flows as the aircraft travels through the air, comprising:

(a) a software module including a plurality of instructions for computing, from numerical representations of three Clebsch scalar fields α, β and ν and a density field ρ outside the aircraft, a corresponding numerical representation of an action that is a sum of:

(i) an action integral, from an initial time $t_0$ to a final time $t_1$, of a Lagrangian functional $$L = \int_V \left[-\left(\alpha\frac{\partial\beta}{\partial t} + \frac{\partial\nu}{\partial t}\right) - \frac{1}{2}(\alpha\vec{\nabla}\beta + \vec{\nabla}\nu)^2 - \varepsilon(\rho) - \Phi\right]\rho d^3x,$$

wherein $\epsilon$ is a specific internal energy that is related to ρ via an equation of state of the air, $\Phi$ is a potential of an external force and V is a volume of integration exclusive of the aircraft, (ii) a spatial integral $$\int_V (\alpha\beta + \nu)\rho d^3x$$

wherein α, β, ν and ρ are evaluated at said final time $t_1$, and (iii) a negative of said spatial integral wherein α, β, ν and ρ are evaluated at said initial time $t_0$; for varying said numerical representations of α, β, ν and ρ to extremize said numerical representation of said potential functional, and for computing a velocity vector field as $\alpha\vec{\nabla}\beta + \vec{\nabla}\nu$, said velocity vector field being the information useful in designing the solid body;

(b) a processor for executing said instructions; and (c) a memory for storing said numerical representations.

25. A system for providing information useful in designing a ship past which water having a density $\rho_0$ flows as the ship travels through the water, comprising:

(a) a software module including a plurality of instructions for computing, from numerical representations of three Clebsch scalar fields α, β and ν outside the ship, a corresponding numerical representation of an action that is a sum of:

(i) an action integral, from an initial time $t_0$ to a final time $t_1$, of a Lagrangian functional $$\int_V \left[-\left(\alpha\frac{\partial\beta}{\partial t} + \frac{\partial\nu}{\partial t}\right) - \frac{1}{2}(\alpha\vec{\nabla}\beta + \vec{\nabla}\nu)^2 - \Phi\right]\rho_0 d^3x,$$

wherein $\Phi$ is a potential of an external force and V is a volume of integration exclusive of the ship, (ii) a spatial integral $$\int_v (\alpha\beta + v)\rho d^3 x$$

wherein $\alpha$, $\beta$ and $v$ are evaluated at said final time $t_1$, and
(iii) a negative of said spatial integral wherein $\alpha$, $\beta$ and $v$ are evaluated at said initial time $t_0$; for varying said numerical representations of $\alpha$, $\beta$ and $v$ to extremize said numerical representation of said potential functional, and for computing a velocity vector field as $\alpha\vec{\nabla}\beta+\vec{\nabla}v$, said velocity vector field being the information useful in designing the solid body;

(b) a processor for executing said instructions; and
(c) a memory for storing said numerical representations.

* * * * *